US011675560B2

(12) United States Patent
Margulis

(10) Patent No.: US 11,675,560 B2
(45) Date of Patent: *Jun. 13, 2023

(54) METHODS AND APPARATUS FOR MESH NETWORKING USING WIRELESS DEVICES

(71) Applicant: III Holdings 1, LLC, Wilmington, DE (US)

(72) Inventor: Neal David Margulis, San Francisco, CA (US)

(73) Assignee: III Holdings 1, LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 17/683,751

(22) Filed: Mar. 1, 2022

(65) Prior Publication Data

US 2022/0179612 A1    Jun. 9, 2022

Related U.S. Application Data

(63) Continuation of application No. 17/565,698, filed on Dec. 30, 2021, which is a continuation of application (Continued)

(51) Int. Cl.
*G06F 3/14* (2006.01)
*G06F 1/26* (2006.01)
(Continued)

(52) U.S. Cl.
CPC .......... *G06F 3/1454* (2013.01); *G06F 1/266* (2013.01); *G06F 1/3203* (2013.01); *G06F 1/325* (2013.01);
(Continued)

(58) Field of Classification Search
CPC ....... G06F 3/1454; H04L 65/60; H04L 65/61; H04L 65/65; H04N 21/4122;
(Continued)

(56) References Cited

U.S. PATENT DOCUMENTS 4,094,000 A    6/1978 Brudevold
4,850,891 A    7/1989 Walkup et al.
(Continued)

FOREIGN PATENT DOCUMENTS

EP    0 859 314 A2    8/1998
WO    WO 1999015999    4/1999

OTHER PUBLICATIONS

"MultiNet: Connecting to Multiple IEEE 802.11 Networks Using a Single Wireless Card", Ranveer Chandra, Paramvir Bahl, and Pradeep Bahl, Microsoft Research and Cornell University, Mar. 7-11, 2004, retrieved from http://ieeexplore.IEEE.org/stamp/stamp.jsp?tp=&arnumber=1356976 on Feb. 1, 2018 (hereinafter MultiNet). cited by examiner.

(Continued)

*Primary Examiner* — Suraj M Joshi
*Assistant Examiner* — Jaren Means
(74) *Attorney, Agent, or Firm* — Crowell & Moring LLP

(57) ABSTRACT

A wireless peripheral mode is provided by a host system that communicates to a WiFi infrastructure and, utilizing the same WiFi RF subsystem, also communicates to peripherals. The host system may employ additional RF channels for communicating with high bandwidth peripherals, such as display devices, where high levels of QoS may be managed locally. The host system may be a conventional desktop computer system, a notebook computer system, a multimedia access point, a cell phone, a game machine, a portable game machine, a Personal Digital Assistant (PDA), a smart phone or any other type of device that benefits from accessing both a WiFi infrastructure and local peripherals.

25 Claims, 12 Drawing Sheets

Related U.S. Application Data

No. 17/410,578, filed on Aug. 24, 2021, now abandoned, which is a continuation of application No. 15/092,343, filed on Apr. 6, 2016, now Pat. No. 11,132,164, which is a continuation of application No. 14/274,490, filed on May 9, 2014, now Pat. No. 9,344,237, which is a continuation of application No. 13/622,836, filed on Sep. 19, 2012, now Pat. No. 8,732,328, which is a continuation of application No. 13/225,532, filed on Sep. 5, 2011, now Pat. No. 8,296,453, which is a continuation of application No. 11/230,872, filed on Sep. 19, 2005, now Pat. No. 8,019,883, which is a continuation-in-part of application No. 11/139,149, filed on May 27, 2005, now abandoned, and a continuation-in-part of application No. 11/122,457, filed on May 5, 2005, now Pat. No. 7,667,707.

(60) Provisional application No. 60/705,153, filed on Aug. 4, 2005.

(51) Int. Cl.

| | | |
|---|---|---|
| H04L 5/00 | (2006.01) | |
| G06F 1/3203 | (2019.01) | |
| G06T 19/20 | (2011.01) | |
| H04N 21/47 | (2011.01) | |
| H04N 21/41 | (2011.01) | |
| H04N 21/4363 | (2011.01) | |
| G06T 15/00 | (2011.01) | |
| H04N 21/426 | (2011.01) | |
| H04W 84/18 | (2009.01) | |
| H04N 21/431 | (2011.01) | |
| H04N 21/4402 | (2011.01) | |
| H04L 65/60 | (2022.01) | |
| G06T 11/60 | (2006.01) | |
| G06F 1/3234 | (2019.01) | |
| H04W 84/12 | (2009.01) | |
| H04L 65/61 | (2022.01) | |
| H04L 65/65 | (2022.01) | |

(52) U.S. Cl.
CPC .......... *G06F 3/1431* (2013.01); *G06F 3/1438* (2013.01); *G06F 3/1446* (2013.01); *G06T 11/60* (2013.01); *G06T 15/005* (2013.01); *G06T 19/20* (2013.01); *H04L 5/0037* (2013.01); *H04L 65/60* (2013.01); *H04N 21/4122* (2013.01); *H04N 21/4126* (2013.01); *H04N 21/42653* (2013.01); *H04N 21/4316* (2013.01); *H04N 21/43637* (2013.01); *H04N 21/440218* (2013.01); *H04N 21/47* (2013.01); *H04W 84/18* (2013.01); *H04L 65/61* (2022.05); *H04L 65/65* (2022.05); *H04W 84/12* (2013.01)

(58) Field of Classification Search
CPC ......... H04N 21/4126; H04N 21/42653; H04N 21/4316; H04N 21/43637; H04N 21/440218; H04N 21/47; H04W 84/18; H04W 84/12
See application file for complete search history.

(56) References Cited

U.S. PATENT DOCUMENTS

| | | |
|---|---|---|
| 5,495,533 A | 2/1996 | Linehan et al. |
| 5,576,738 A | 11/1996 | Anwyl et al. |
| 5,602,589 A | 2/1997 | Vishwanath |
| 5,608,872 A | 3/1997 | Schwartz |
| 5,675,390 A | 10/1997 | Schindler |
| 5,708,961 A | 1/1998 | Hylton |
| 5,732,077 A | 3/1998 | Whitehead |
| 5,801,985 A | 9/1998 | Roohparvar et al. |
| 5,850,482 A | 12/1998 | Meaney |
| 5,852,437 A | 12/1998 | Wugofski |
| 5,862,348 A | 1/1999 | Pedersen |
| 5,909,518 A | 6/1999 | Chui |
| 5,911,582 A | 6/1999 | Redford |
| 5,930,167 A | 7/1999 | Lee et al. |
| 5,960,012 A | 9/1999 | Spracklen |
| 5,977,933 A | 11/1999 | Wicher |
| 6,008,847 A | 12/1999 | Bauchspies |
| 6,014,694 A | 1/2000 | Aharoni et al. |
| 6,031,940 A | 2/2000 | Chui |
| 6,075,906 A | 6/2000 | Fenwick |
| 6,075,938 A | 6/2000 | Bugnion |
| 6,097,441 A | 8/2000 | Allport |
| 6,104,334 A | 8/2000 | Allport |
| 6,141,059 A | 10/2000 | Boyce |
| 6,141,447 A | 10/2000 | Linzer |
| 6,166,734 A | 12/2000 | Nahi et al. |
| 6,195,712 B1 | 2/2001 | Pawlowski |
| 6,222,885 B1 | 4/2001 | Chaddha |
| 6,256,019 B1 | 7/2001 | Allport |
| 6,263,503 B1 | 7/2001 | Margulis |
| 6,282,714 B1 | 8/2001 | Ghori |
| 6,321,287 B1 | 11/2001 | Rao et al. |
| 6,323,854 B1 | 11/2001 | Knox et al. |
| 6,340,994 B1 | 1/2002 | Margulis |
| 6,388,671 B1 | 5/2002 | Yoshizawa et al. |
| 6,409,602 B1 | 6/2002 | Wiltshire |
| 6,437,803 B1 | 8/2002 | Panasyuk |
| 6,456,340 B1 | 9/2002 | Margulis |
| 6,501,441 B1 | 12/2002 | Ludtke et al. |
| 6,510,177 B1 | 1/2003 | De Bonet |
| 6,522,334 B2 | 2/2003 | Schauser |
| 6,600,838 B2 | 7/2003 | Chui |
| 6,611,530 B1 | 8/2003 | Apostolopoulos |
| 6,628,716 B1 | 9/2003 | Tan |
| 6,658,019 B1 | 12/2003 | Chen |
| 6,694,354 B1 | 2/2004 | Elg |
| 6,701,380 B2 | 3/2004 | Schneider |
| 6,704,791 B1 | 3/2004 | Harris |
| 6,721,837 B2 | 4/2004 | MacInnis |
| 6,725,289 B1 | 4/2004 | Waldspurger |
| 6,754,266 B2 | 6/2004 | Bahl |
| 6,757,851 B1 | 6/2004 | Park |
| 6,768,775 B1 | 7/2004 | Wen |
| 6,771,828 B1 | 8/2004 | Malvar |
| 6,774,912 B1 | 8/2004 | Ahmed |
| 6,781,601 B2 | 8/2004 | Cheung |
| 6,785,700 B2 | 8/2004 | Masud |
| 6,798,838 B1 | 9/2004 | Ngo |
| 6,806,885 B1 | 10/2004 | Pipe et al. |
| 6,807,308 B2 | 10/2004 | Chui |
| 6,816,194 B2 | 11/2004 | Zhang |
| 6,826,242 B2 | 11/2004 | Ojard |
| 6,828,967 B1 | 12/2004 | King |
| 6,834,123 B2 | 12/2004 | Acharya |
| 6,839,079 B2 | 1/2005 | Barlow |
| 6,842,777 B1 | 1/2005 | Tuli |
| 6,847,468 B2 | 1/2005 | Ferriere |
| 6,850,571 B2 | 2/2005 | Tardif |
| 6,850,649 B1 | 2/2005 | Malvar |
| 6,853,385 B1 | 2/2005 | MacInnis |
| 6,868,083 B2 | 3/2005 | Apostolopoulos |
| 6,898,583 B1 | 5/2005 | Rising |
| 6,952,217 B1 | 10/2005 | Diard |
| 6,975,323 B1 | 12/2005 | Yamamoto |
| 6,977,693 B2 | 12/2005 | Aronovitz |
| 6,980,695 B2 | 12/2005 | Mehrotra |
| 6,985,159 B2 | 1/2006 | Brown |
| 7,035,854 B2 | 4/2006 | Hsiao et al. |
| 7,043,697 B1 | 5/2006 | Jensen |
| 7,098,868 B2 | 8/2006 | Love et al. |
| 7,127,525 B2 | 10/2006 | Coleman |
| 7,127,633 B1 | 10/2006 | Olson et al. |

(56) References Cited

U.S. PATENT DOCUMENTS

| | | | |
|---|---|---|---|
| 7,243,351 B2 | 7/2007 | Kundu | |
| 7,383,341 B1 | 6/2008 | Saito et al. | |
| 7,446,775 B2 | 11/2008 | Hara et al. | |
| 7,477,205 B1 | 1/2009 | de Waal et al. | |
| 7,568,199 B2 | 7/2009 | Bozak et al. | |
| 7,667,707 B1 | 2/2010 | Margulis | |
| 7,685,602 B1 | 3/2010 | Tran et al. | |
| 8,019,883 B1 | 9/2011 | Margulis | |
| 8,196,133 B2 | 6/2012 | Kakumani et al. | |
| 8,296,453 B1 | 10/2012 | Margulis | |
| 8,726,278 B1 | 5/2014 | Shawver et al. | |
| 8,732,328 B2 | 5/2014 | Margulis | |
| 9,344,237 B2 | 5/2016 | Margulis | |
| 11,132,164 B2 | 9/2021 | Margulis | |
| 2001/0021998 A1 | 9/2001 | Margulis | |
| 2001/0056501 A1 | 12/2001 | Law | |
| 2002/0032716 A1 | 3/2002 | Nagato | |
| 2002/0059094 A1 | 5/2002 | Hosea et al. | |
| 2002/0186846 A1 | 12/2002 | Nyberg | |
| 2003/0026398 A1 | 2/2003 | Duran et al. | |
| 2003/0066046 A1 | 4/2003 | Dawson | |
| 2003/0086388 A1 | 5/2003 | Peters et al. | |
| 2003/0099301 A1 | 5/2003 | Green | |
| 2003/0126013 A1 | 7/2003 | Shand | |
| 2003/0154112 A1 | 8/2003 | Neiman et al. | |
| 2003/0181213 A1 | 9/2003 | Sugar | |
| 2004/0015973 A1 | 1/2004 | Skovira | |
| 2004/0090924 A1* | 5/2004 | Giaimo | H04W 40/00 370/252 |
| 2004/0201544 A1 | 10/2004 | Love et al. | |
| 2005/0025182 A1 | 2/2005 | Nazari | |
| 2005/0128048 A1 | 6/2005 | Krzyzanowski | |
| 2005/0132363 A1 | 6/2005 | Tewari et al. | |
| 2005/0141480 A1 | 6/2005 | Jin | |
| 2005/0165916 A1 | 7/2005 | Cromer | |
| 2005/0174962 A1* | 8/2005 | Gurevich | H04W 88/06 370/328 |
| 2005/0204015 A1 | 9/2005 | Steinhart et al. | |
| 2005/0210158 A1 | 9/2005 | Cowperthwaite et al. | |
| 2005/0246453 A1 | 11/2005 | Erlingsson et al. | |
| 2005/0249137 A1* | 11/2005 | Todd | H04W 52/0216 370/311 |
| 2005/0271006 A1* | 12/2005 | Chari | H04W 72/02 455/450 |
| 2006/0015621 A1 | 1/2006 | Quinn | |
| 2006/0048157 A1 | 3/2006 | Dawson | |
| 2006/0050729 A1 | 3/2006 | Chen | |
| 2006/0050742 A1* | 3/2006 | Grandhi | H04W 74/08 370/506 |
| 2006/0117371 A1 | 6/2006 | Margulis | |
| 2006/0128349 A1* | 6/2006 | Yoon | H04W 52/0235 455/574 |
| 2006/0132489 A1 | 6/2006 | Blaho | |
| 2006/0139360 A1 | 6/2006 | Panesar et al. | |
| 2006/0146057 A1 | 7/2006 | Blythe | |
| 2006/0164324 A1 | 7/2006 | Polivy et al. | |
| 2006/0165236 A1 | 7/2006 | Little | |
| 2006/0190532 A1 | 8/2006 | Chadalavada | |
| 2006/0197660 A1 | 9/2006 | Luebke | |
| 2006/0205354 A1 | 9/2006 | Pirzada et al. | |
| 2006/0233191 A1 | 10/2006 | Pirzada et al. | |
| 2006/0252418 A1 | 11/2006 | Quinn et al. | |
| 2006/0264227 A1 | 11/2006 | Takahashi et al. | |
| 2007/0025246 A1 | 2/2007 | Pirzada | |
| 2007/0028244 A1 | 2/2007 | Landis et al. | |
| 2007/0146782 A1 | 6/2007 | Lehotsky et al. | |
| 2007/0249331 A1 | 10/2007 | Sinivaara et al. | |
| 2009/0252134 A1 | 10/2009 | Schlicht | |
| 2011/0179134 A1 | 7/2011 | Mayo et al. | |

OTHER PUBLICATIONS

Schmidt, B.K., Lam, M.S., Northcutt, J.D.; The Interactive Performance of SLIM: a Stateless, Thin-client Architecture; 17th ACM Symposium on Operating Systems Principles (SOSP'99); Dec. 1999; pp. 32-47; Published as Operating Systems Review, 34(5); ACM. cited by applicant.

Skodras et al., "JPEG2000: The Upcoming Still Image Compression Standard," May 11, 2000, 14 pages. cited by applicant.

Gary C. Kessler, "An Overview of TCP/IP Protocols and the Internet," InterNIC Document, Dec. 29, 2004, 42 pages. cited by applicant.

Eric J. Balster, "Video Compression and Rate Control Methods Based on the Wavelet Transform," The Ohio State University, 2004, pp. 1-24. cited by applicant.

Taubman et al., "Embedded Block Coding in JPEG2000," Feb. 23, 2001, pp. 1-8 of 36, Hewlett-Packard, Palo Alto, CA. cited by applicant.

Kulapala et al., "Comparison of Traffic and Quality Characteristics of Rate-Controlled Wavelet and DCT Video," Oct. 11, 2004, 6 pages, Arizona State University, Tempe, AZ. cited by applicant.

"Remote Desktop Protocol," Platform SDK: Terminal Services, Jun. 2005, 2 pages, Miicrrosoft Corporation Web Site, Redmond, WA. cited by applicant.

"Matrox QID Pro" Jun. 2005, 3 pages, Matrox Graphics web site product specification, Matrox Electronic Systems Ltd., Dorval, Quebec, Canada. cited by applicant.

Ian Griffiths, "A First Look at 3-D Support in Avalon," Jun. 2004, 11 pages, Microsoft Corporation Web Site, Redmond,WA. cited by applicant.

Wee et al., "Transcoding MPEG Video Streams in the Compressed Domain," HP Image and Data Compression Conference, Mar. 13, 1997, 10 pages, Hewlett-Packard, Palo Alto, CA. cited by applicant.

Luk Verboven, "Wireless Technology Update," Anixter Technology Group, 5 pages, Mar. 2004, reprints from Network World, Mar. 29, 2004 and unattributed. cited by applicant.

Millman, S.E., "LP-5: Late-News Poster: UPdate to VESA Digital Packet Video Link (DPVL) Proposed Standard," SID 04 Digest, 2004, pp. 412-415, ISSN/0004-0966X/04/3501-0412. cited by applicant.

Lamm, J.D. "Digital Packet Video Link—A VESA Proposed Standard," SID 03 Digest, 2003, pp. 1021-1023, ISSN/0003-0966X/03/3402-1021. cited by applicant.

Bejerano et al., "A Framework for Fairness and QoS Assurance in Current IEEE 802.11 Networks . . . " IEEE INFOCOM 2004, 12 pages, Bell Labs, Murray Hill, NJ. cited by applicant.

Lindren et al., "Quality of Service Schemes for IEEE 802.11," 7 pages, Lulea University of Technology, Lulea, Sweden. cited by applicant.

Godfrey, "Inside 802-11e: Making QoS a Reality over WLAN Connections," GlobespanVirata, Dec. 19, 2003, 8 pages, http://www.commsdesign.com/showArticle.jhtml?articleID=17000388. cited by applicant.

Baratto, R.A., Kim, L.J., Nieh, J.; THINC: A Virtual Display Architecture for Thin-Client Computing; SOSP '05, Brighton, United Kingdom; Oct. 23-26, 2005; pp. 1-14; ACM 1-59593-079-5/05/0010. cited by applicant.

Fraser, K., Hand, S., Neugebauer, R., Pratt, I., Warfield, A., Williamson, M.; Safe Hardware Access with the Xen Virtual Machine Monitor; pp. 1-10; University of Cambridge Computer Laboratory; Cambridge, United Kingdom. cited by applicant.

"Ethernet Audio Network Manual", Second Edition, Nov. 2002, 68 pages. cited by applicant.

"KWorld Xpert Tv=PVR USB2.0 XPert Tv=PVR USC2.0 USB 2.0 Interface", https://www.newegg.com/product/product.aspx?item=N82E16815100136, dated Aug. 15, 2017, 3 pages. cited by applicant.

"MultiNet Connecting to Multiple IEEE 802.11 Networks Using a Single Wireless Card", 12 pages. cited by applicant.

"Securely Operating Windows Terminal Services/Remote Desktop in a Multiplatform Environment", GIAC Security Essentials Certification, Feb. 23, 2004, 18 pages. cited by applicant.

"Vodafone Mobile Connect 3GIGPRS datacard", http://www.zdnet.com, dated Aug. 15, 2017, 7 pages. cited by applicant.

Caesar et al., "Design and Implementation of a Routing Control Platform," Usenix, NSDI '05 Paper, Technical Program, obtained

(56) References Cited

OTHER PUBLICATIONS from the Internet, on Apr. 13, 2021, at URL<https://www.usenix.org/legacy/event/nsdi05/tech/full_papers/caesar/ca-esar_html/>, 23 pages. cited by applicant.

Bader et al.; "Applications"; The International Journal of High Performance Computing Applications, vol. 15, No. ; pp. 181-185; Summer 2001.

Coomer et al.; "Introduction to the Cluster Grid—Part 1"; Sun Microsystems White Paper; 19 pages; Aug. 2002.

Joseph et al.; "Evolution of grid computing architecture and grid adoption models"; IBM Systems Journal, vol. 43, No. 4; 22 pages; 2004.

Smith et al.; "Grid computing"; MIT Sloan Management Review, vol. 46, Iss. 1.; 5 pages; Fall 2004.

"Microsoft Computer Dictionary, 5th Ed."; Microsoft Press; 3 pages; 2002.

"Random House Concise Dictionary of Science & Computers"; 3 pages; Helicon Publishing; 2004.

Office Action in U.S. Appl. No. 17/565,698, including form 892 references cited by examiner, dated Apr. 13, 2022, 36 pages.

Office Action in U.S. Appl. No. 17/565,698, including form 892 references cited by examiner, dated Sep. 20, 2022, 44 pages.

Office Action, Advisory Action, in U.S. Appl. No. 17/565,698, dated Jan. 5, 2023, 5 pages.

Notice of Allowance in U.S. Appl. No. 17/565,698, including form 892 references cited by examiner, dated Mar. 22, 2023, 9 pages.

\* cited by examiner

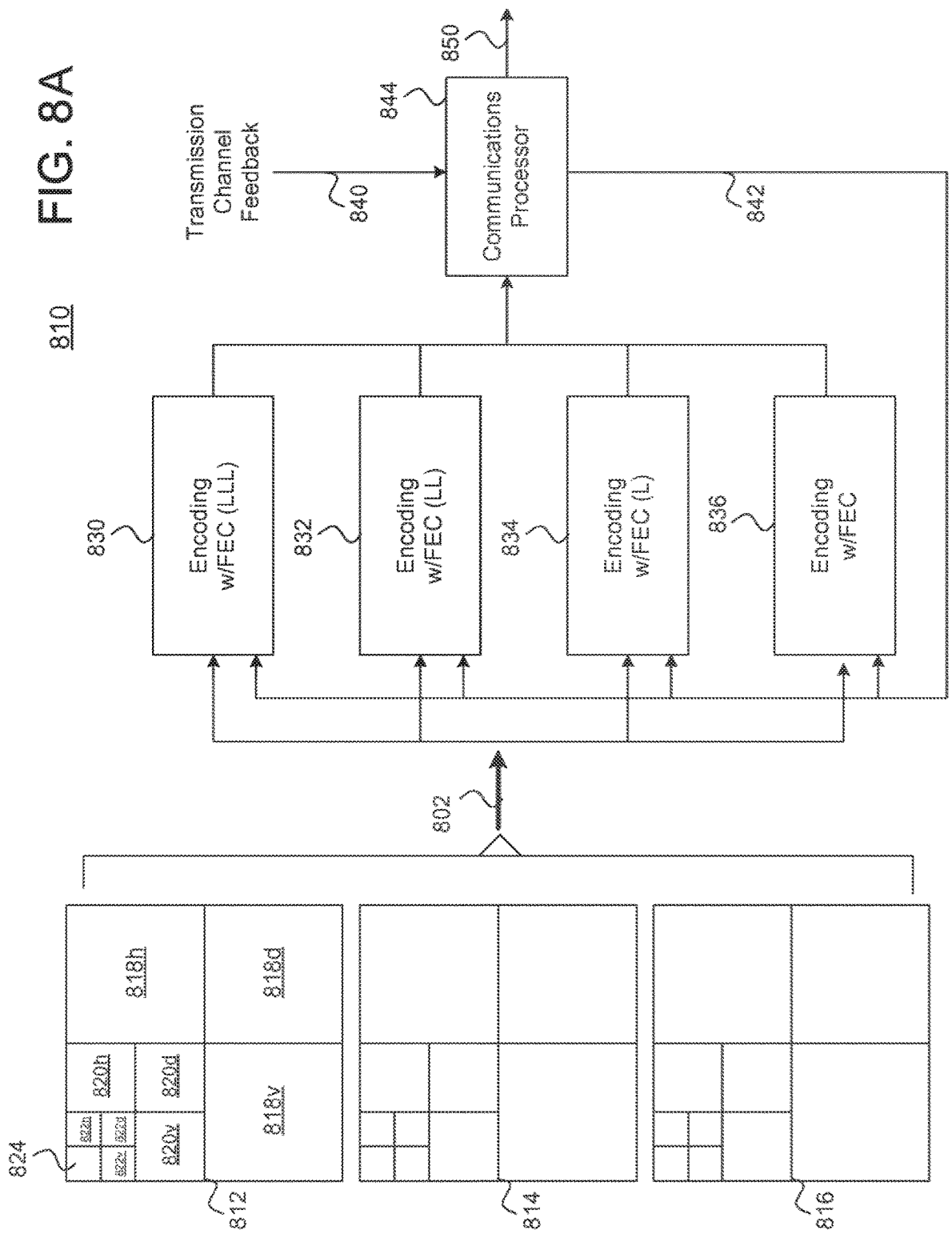

METHODS AND APPARATUS FOR MESH NETWORKING USING WIRELESS DEVICES

This application is a continuation of U.S. patent application Ser. No. 17/565,698, filed Dec. 30, 2021, which is a continuation of U.S. patent application Ser. No. 17/410,578, filed Aug. 24, 2021 (now abandoned), which is a continuation of U.S. patent application Ser. No. 15/092,343, filed Apr. 6, 2016 (now U.S. Pat. No. 11,132,164), which is a continuation of U.S. patent application Ser. No. 14/274,490, filed May 9, 2014 (now U.S. Pat. No. 9,344,237), which is a continuation of U.S. patent application Ser. No. 13/622,836, filed Sep. 19, 2012 (now U.S. Pat. No. 8,732,328), which is a continuation of U.S. patent application Ser. No. 13/225,532, filed Sep. 5, 2011 (now U.S. Pat. No. 8,296,453), which is a continuation of U.S. patent application Ser. No. 11/230,872, filed Sep. 19, 2005 (now U.S. Pat. No. 8,019,883), which (1) claims the benefit of priority to U.S. Patent Provisional Application No. 60/705,153, filed Aug. 4, 2005, (2) is a continuation-in-part of U.S. patent application Ser. No. 11/139,149, filed May 27, 2005 (now abandoned), and (3) is a continuation-in-part of U.S. patent application Ser. No. 11/122,457, filed May 5, 2005 (now U.S. Pat. No. 7,667,707).

BACKGROUND OF THE INVENTION

1. Field of the Invention

The present invention relates generally to a computer system for wirelessly connecting peripheral devices and more particularly to methods for wirelessly connecting a host computer to supporting WiFi peripherals and for wirelessly supporting additional display systems.

2. Description of the Background Art

In recent years, there has been growing popularity for the WiFi standard for wireless communication. WiFi is a collection of standards of which the main standards are 802.11g (which incorporates 802.11b) and 802.11a. Within the WiFi standard there are numerous required and optional modes as well as a continually advancing set of enhancements and proposed enhancements. WiFi can be found in practically every new portable computer and in an increasing number of desktop computers, telephones, televisions, digital media players and cellular phones. WiFi based Local Area Networks (WLANs) are found in most airports, coffee shops, businesses, college campuses, city centers and an increasing number of other areas.

Developing effective methods for operating wireless electronic peripherals is a significant challenge for modern system designers. In a typical system, wireless peripherals, such as a keyboard and mouse, use dedicated RF chips with their own RF channels to communicate with a computer. This adds cost to the computer system and if, as is typical, the computer does not integrate the RF chips for peripheral devices, requires the use of an external dongle.

Recently, computers and cell phones have utilized the Bluetooth standard for supporting a variety of peripherals including keyboards, mice and telephone headsets. Bluetooth is a more general standard that is more readily integrated directly into computers and cell phones. However, Bluetooth still adds a dedicated RE subsystem and since Bluetooth uses the same RF spectrum as WiFi's 802.11g, additional care must be taken to avoid interference between the two. Other power or cost sensitive devices, such as the Sony Play Station Portable (PSP) may include only a WiFi RF subsystem and the most convenient method for adding wireless peripherals is to provide wireless peripherals supporting WiFi.

A device such as a computer on a WiFi network has two modes of operation, Infrastructure mode and Ad-Hoc mode. Infrastructure mode allows the computer to communicate with the Access Points (AP) of a WiFi network and gain access to services such as the Internet. Ad-Hoc mode allows devices to talk directly to each other without utilizing the APs. These modes are mutually exclusive so a device can not talk to both an AP and another device during the same session.

Mesh Networking is a technique for wireless communications where, instead of a conventional hub-and-spoke model with every device connecting to a central access point, every device (area) acts as a repeater or router. When mesh-enabled devices are in range of one another they automatically create a wireless mesh network, and traffic hops from device to device until it reaches the nearest AP that includes wired backhaul. Mesh networking reduces the need for more powerful central AP antennas and improves wireless coverage. One downside of mesh networking is that it increases the minimum processing capability needed by each mesh device. While adding mesh capability typically would not be a problem for a computer, adding conventional mesh capability for peripherals and in particular for low cost battery based peripherals is a large burden.

For high bandwidth and time critical communication, such as between a computer and a computer display, it may be particularly desirable to add RF capacity beyond the RF channel used for WiFi infrastructure. If the more general network traffic is not normally part of the same RIF channel then such a channel can operate in a high QoS mode. Options for the additional RE channel may include an additional channel of WiFi (WiFi supports multiple non-overlapping channels), a WiFi channel in a different RF band (802.11a operates in the 5 GHz spectrum while 802.11g operates in the 2.4 GHz spectrum) or a different RF protocol such as Ultra Wide Band (UWB).

Adding additional RF channels to the host system is best done for peripheral devices that need high bandwidth and high QoS. For low bandwidth low cost peripherals it is not desirable to either add additional RF channels or increase the complexity of the WiFi features. However, standard WiFi does not support a host system that can concurrently operate a single WiFi channel for both infrastructure mode and peripheral support. Therefore, what is needed is an effective Wireless architecture where a host system can maintain the best available mode of access to the WiFi AP infrastructure while concurrently utilizing low cost peripherals which also use the WiFi RF channel where any additional RE channels added to the system are used for high performance connections.

SUMMARY OF THE INVENTION

The present invention provides an efficient architecture for a multi-display system. In one embodiment, initially, a multi-display computer system sharing one host computer system provides one or more remote display systems with interactive graphics and video capabilities. The host computer system generally manages frames that correspond to each remote display system and manages updating the remote display systems over a network connection. Three preferred embodiments are discussed in detail, and many variations are discussed in lesser detail.

In a first preferred embodiment, a host computer utilizes some combination of software and conventional graphics processing blocks to support multiple displays. The graphics processor is configured for a very large frame size or some combination of frame sizes that are managed to correspond to the remote display systems. The software includes a tracking software layer that can track when the frame contents for each display, the surfaces or subframes that comprise each frame, and potentially which precincts or blocks of each surface, are updated. The encoding process for the frames, processed surfaces or subframes, or precincts of blocks, can be performed by some combination of the CPU and one of the processing units of the graphics processor.

In a second preferred embodiment, a host computer utilizes a traditional graphics processor whose display output paths, normally utilized for local display devices, are connected to a multi-display processor. Supporting a combination of local and remote displays is possible. For remote displays, the graphics processor is configured to output multiple frames over the display output path at the highest frame rate possible for the number of frames supported in any one instance. The multi-display processor, configured to recognize the frame configurations for each display, manages the display data at the frame, scan line, group of scan line, precinct, or block level to determine which remote displays need which subframe updates. The multi-display processor then encodes the appropriate subframes and prepares the data for transmission to the appropriate remote display system.

A third preferred embodiment integrates a graphics processor and a multi-display processor to optimize a system configuration. This integration allows for enhanced management of the display frames within a shared RAM where the graphics processor has more specific knowledge for each frame. Additionally, the sharing of RAM allows the multi-display processor to access the frame data directly to both manage the frame and subframe updates and to perform the data encoding based on efficient memory accesses. A system-on-chip implementation of this integrated or combined solution is described in detail.

In each system, after the data is encoded, a network processor, or CPU working in conjunction with a simpler network controller, transmits the encoded data over wired and/or wireless network(s) to a remote display system(s). Each remote display system decodes the data intended for its display, manages the frame updates and performs the necessary processing for the display screen. Other features, such as masking packets lost in network transmission, are managed by the remote display system(s). When there are no new frame updates, the remote display controller refreshes the display screen with the data from the prior frame.

The system may feed back network information from the various wired and wireless network connections to the host system CPU, frame management and data encoding systems. The host system uses the network information to affect the various processing steps of producing display frame updates and, based on the network feedback, can vary the frame rate and data encoding for different remote display systems. Additionally, for systems that include noisy transmission channels as part of the network system, the encoding step may be combined with forward error correction protection in order to prepare the transmit data for the characteristics of the transmission channel. The combination of these steps produces an optimal system for maintaining an optimal frame rate with low latency for each of the remote display systems.

The present invention further provides a method for implementing a "peripheral mode" or "WiFi-P mode" for wireless systems where a host system can maintain the best available mode of access to the WiFi AP infrastructure while concurrently utilizing low cost peripherals which also use the WiFi RF channel. Additionally, the host system may employ additional RF channels for communicating with high bandwidth peripherals, such as display devices, where high levels of QoS may be managed locally. The host system may be a conventional desktop computer system, a notebook computer system, a multi-media access point, a cell phone, a (portable) game machine, a Personal Digital Assistant (PDA), a smart phone or any other type of device that benefits from accessing both a WiFi infrastructure and local peripherals.

Each host system may utilize whichever capabilities of the WiFi infrastructure mode device that it chooses. For example, the host may support advanced operating modes, such as the Point Coordination Function (PCF) or extensions to the standard such as 802.11n for Multiple Input and Multiple Output (MIMO) antennas, 802.11e for QoS, or for extending the reach of the WiFi network with repeater capabilities or extensions such as 802.11s for mesh capabilities. While operating in what the invention refers to as "WiFi-Peripheral" (WiFi-P) mode, the peripheral devices, without directly utilizing the WiFi AP infrastructure, communicate with the host system. Simpler devices such as a keyboard or mouse may be designed to use only the WiFi-P mode to communicate with a host, and could not communicate with a WiFi infrastructure device which did not host a WiFi-P mode. More sophisticated devices such as a wireless display may support standard WiFi modes, WiFi-P modes, modes which include additional RIF channels, or some combination of modes. Other enhancements for low power operation of peripherals are also supported.

Therefore, the present invention effectively implements an enhanced multi-display system and a flexible wireless peripheral mode that utilizes various heterogeneous components to facilitate optimal system interoperability and functionality.

BRIEF DESCRIPTION OF THE DRAWINGS

FIG. 8A is a data flow chart for how subband encoded frames of display proceed thorough the processing steps in accordance with one embodiment of the invention;

DETAILED DESCRIPTION OF THE PREFERRED EMBODIMENTS

The present invention relates to improvements for a multi-display processor and wireless peripheral system. While the described embodiments relate to a host computer system, the same principles and features could be equally applied to host cell phone, host MP3 player and host media system.

Figure 1:
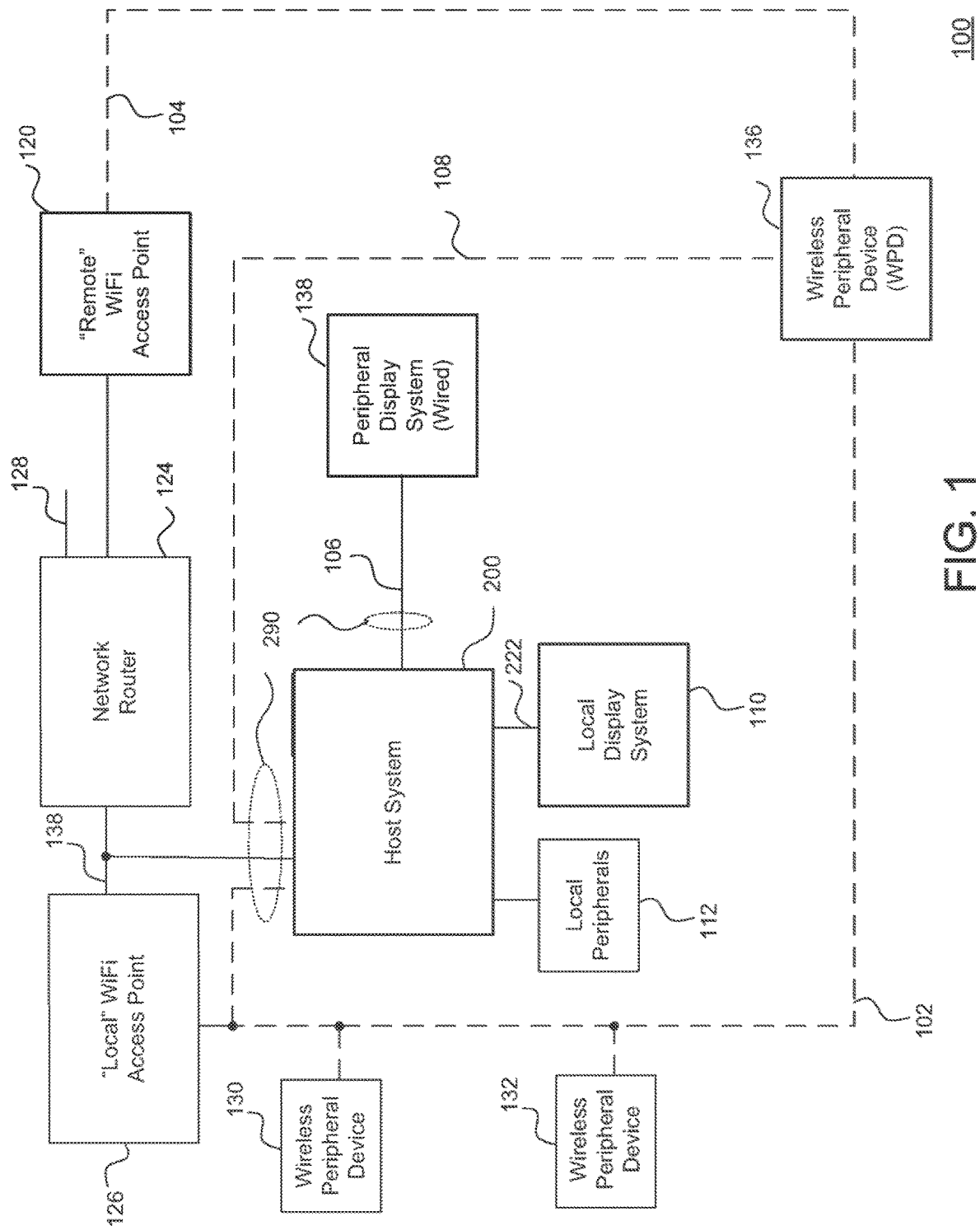
FIG. 1 is a block diagram of a multi-display computer system including a host system connected over one or more networks to various peripherals and network elements.

Referring to FIG. 1, the invention provides an architecture for a wireless peripheral system 100 to make use of wireless peripherals 130, 132 and 136. A host computer 200 processes multiple windows desktop environments, typically one for each display, and, besides supporting local display 110, produces display update network streams over wired network(s) 290 to each of remote displays 300, 302, 304, etc., or over a wireless network 290 to display 306. For a multi-user system, users at the remote locations are able to time-share the host computer 200 as if it were their own local computer and have complete support for all types of graphics, text and video content with the same type of user experience that could be achieved on a local computer. A host system 200 may be connected via a wired connection 138 to a network 128 or may be part of a wireless network 102. A wired network 128 may be a conventional wired Ethernet network or another wire technology such as COAX or power line. In any of those cases, the network interface of host system 200 is managed by a Physical (PHY) interface as well as a network controller that is capable of supporting the protocols associated with the physical interface. In addition to or instead of a wired network interface, the host system 200 may be part of a wireless network 102 that may conform to elements of the WiFi standards. WiFi is a general term encompassing detailed specifications for different versions such as 802.11g and 802.11a which operate in different bands, as well as an ongoing list of enhancements to each specification including 802.11e, n, s and future derivatives.

As part of a WiFi network, the host system 200 communicates to a local WiFi Access Point 126 which may include a router or may use a separate network router 124. The router may include access to the Internet via a connection to a Wide Area Network (WAN) or may include a Local Area Network (LAN) connection 128 to an external modem (not shown) that provides a WAN connection.

The network router 124 may include a wireless interface or may support additional "Remote" WiFi Access Point(s) (APs) 120. The Remote WiFi Access Point 120 may operate with a different protocol in a different RF band than the local WiFi Access Point 126, may operate within the same band on a different channel, or may operate on the same channel if the distance between the access points is sufficient.

The host system 200 may include a variety of local peripherals 112 (a keyboard or mouse) that are connected over specific interfaces such as over a serial port, or a more general wired interface such as a Universal Serial Bus (USB) port or a 1394 port (not shown). A local display system 110 may be connected over a variety of high speed wired connections 222 such as Digital Video Interface (DVI), High Definition Multimedia Interface (HDMI) or another electrical or optical interface for transmitting uncompressed video data to a display device to the host system 200. The host system may also include interfaces for networked peripherals that are separate from the primary network interface used for the host system to access the Internet. Such an example would be a second Gigabit Ethernet connection 106 to a peripheral display system 138, or an Ultra Wide Band wireless interface 108 to a Wireless Peripheral Device 136.

The host system 200 may also include dedicated wireless links to Wireless Peripheral Devices (WPDs) 130 and 132 that may be completely separate from the WiFi network or to varying degrees part of the WiFi network. Such examples are wireless keyboards, mice and headsets that may use either proprietary wireless solutions or may use Bluetooth. Dedicated wireless solutions may be designed for very low power operation and may be tuned to the application and for very high battery life for the wireless peripheral device. Since a WPD such as a keyboard or mouse is low bandwidth, and does not typically need network services, there is a significant advantage to not including a standard WiFi interface in such a device. Although some host systems may be designed to include proprietary wireless solutions, it is typically necessary to include a dongle in the form of an external block connected over a USB port to the host. Including Bluetooth in a system that also includes 802.11g WiFi, where both use the same RE band, requires special attention to avoid RF interference. Bluetooth does include some modes to support lower power communication that may be used by Bluetooth peripherals to reduce power consumption. However, in a host system having WiFi, use of Bluetooth still requires an additional wireless subsystem.

While a wireless keyboard or mouse is not interesting as part of a network when it is not local to the host system, other devices, such as a Voice over IP (VoIP) telephone handset or a display screen may be useful both within and out of proximity of a host system. To work in a standard system, a WiFi VoIP telephone handset or a WiFi display screen needs to be part of the WiFi network and communicate directly with a router or access point. Similarly, if a WiFi keyboard or mouse were to be designed, the conventional method to communicate with a host for a standard system would be to use the WiFi router or access point as an intermediary between the peripheral and the host. An embodiment of the invention enhances the WiFi subsystem in the host system, such that a host system can more directly support wireless peripheral devices in a special WiFi peripheral mode (WiFi-P). In some embodiments, the WiFi-P mode may provide software layers similar to Bluetooth services for managing host-to-peripheral communication including setup and security. In some embodiments, the communication between the WiFi host system and the WPD does not use standard IP protocols but instead utilizes a very efficient layer 2 communication scheme that is based on the MAC address of the WPD.

WiFi-P Keyboards and Mice

Keyboards and mice are low bandwidth data entry peripherals that lend themselves to be wireless because they are relatively low power so that they can run on batteries, and there is a user benefit in eliminating the wires that connect them to the host system. There is relatively little need to have a keyboard or mouse enabled as a full network device, so supporting a special peripheral mode where the keyboard and mouse are primarily utilized by a host system does not reduce their usefulness. In prior art systems, wireless keyboards and mice utilized either dedicated wireless links to the computer or utilized Bluetooth, thus requiring additional RF support in the host system.

Since the host system will typically require WiFi for network connectivity, it is useful to provide an ability for the host system to utilize WiFi peripherals such as a keyboard and mouse. A special peripheral mode is required so that the host system can operate in standard infrastructure mode, and maintain connectivity to the network while simultaneously supporting locally connected peripherals. WiFi Ad-Hoc mode is the conventional method for WiFi devices to communicate directly with each other. Ad-Hoc mode is undesirable in this situation, as a host system while operating in Ad-Hoc mode does not have network connectivity. WiFi-P mode allows the host system to maintain network connectivity while also supporting a wireless keyboard and mouse utilizing the same WiFi subsystem.

Since both keyboards and mice are low bandwidth devices, the communication between these WPDs and the host system may be optimized around preserving battery life and assuring that the latency is not too high. To preserve the battery life, the RF power levels can be kept low, provided they are high enough to cover the distance between the WPD and the host system. Other protocol techniques to lower the power are discussed below. Also, in some embodiments, the protocol can be kept very simple and does not need to utilize full IP packet based communication. A simpler lower level MAC address based protocol can be utilized.

WiFi-P VoIP Handset

A conventional Voice-over IP (VoIP) handset can be used to initiate and receive VoIP phone calls whenever such a device is included on a WiFi network. The WiFi-P mode may be added to a complete WiFi compatible VoIP handset, or a special reduced capability handset that includes only WiFi-P may be developed. The advantage of the WiFi-P mode is that it is a lower power mode for when the handset is within range of a host system.

WiFi-P Cell Phone Host System

Currently cell phones utilize Bluetooth for the wireless link to a phone headset. As cell phones incorporate WiFi for broadband and VoIP communication, the same WiFi subsystem can be used to support a WiFi-P phone headset. The advantage is that only one RF subsystem would be required in the cell phone. The software services on the cell phone could be the same as with the Bluetooth services where the management of the lower level network and radio could be managed transparently to the application.

WiFi-P Audio Headset

MP3 players connect with a host system utilizing either a wired or wireless connection. Some MP3 players have been designed with docking stations to allow connectivity over a standard network. Increasingly, it will be desirable to include network connectivity within the MP3 player itself. For a variety of reasons, that connectivity is likely to be WiFi based. Once the MP3 player includes a WiFi subsystem, it becomes possible to utilize that same WiFi subsystem to support a wireless audio headset.

Wireless headsets being constrained to be light means using smaller batteries, making it challenging to satisfy the power requirements for such a wireless headset. As such, supporting a Wi-Fi-P mode with lower power consumption is desirable.

WiFi-P Display System

Since the cost of a display screen is typically a large component of a display system, saving money on the wireless subsystem is not typically the first priority. However, achieving high quality for video playback may require managing Quality of Service (QoS) which may be better performed with a connection from the host to the display that does not necessarily traverse the entire network. As described below with reference to FIG. 3, a WiFi display system can make use of multiple wireless interfaces to achieve both portability and the highest display quality based on proximity to the host system and the other wireless access points of a system.

WiFi-P Notebook Wireless Docking Station

Another useful application is a wireless docking station for a notebook computer. Notebook computer docking stations often include wired connections for a network, keyboard, mouse, external monitor and other peripherals. Since the network is now often available as a wireless connection in an office or home, moving the other devices such as keyboard, mouse and monitor to also utilize wireless technology makes the concept of a wireless docking station more useful. When a notebook computer comes within range, the wireless monitor and keyboard could query the user whether he wanted to utilize the notebook. Then, without physically connecting the notebook to any devices, the notebook could be utilized by the wireless monitor and mouse. Additional technologies for connector-less power charging solutions could be combined so that a notebook, still in a briefcase, could be used in such a wireless docking station configuration. A variety of securing mechanisms could also be employed to prevent unauthorized access to the notebook computer.

WiFi-P for Media Base Station Host System

Current media base stations such as the Sony LF-X1 wireless television base stations utilize both a wired Ethernet and a wireless Ethernet connection for simultaneously supporting connectivity to the Internet and connectivity to a wireless peripheral "location free" television display. The Sony wireless peripheral location free display only works when in range of the media base station. Even though the media base station is part of the network, the media base station and the location free television display can not automatically switch to a network based connection when the location free television is out of range of the media base station. Only after the user manually configures the setup can the display access content from the base station over a network-based connection. The preferred operation of the display is to wirelessly connect directly to the wireless media base station when it is in range, and when it is not in range to automatically switch to a network based connection. In a preferred embodiment of the present invention, when a wireless display is out of wireless range of a media base station, but within range of another remote access point or connected to the network infrastructure via another means, the media base station uses the network infrastructure to provide the requested media to the wireless peripheral. The network infrastructure for such a path may require use of both wired and wireless links and as such the media base station may use the wired network infrastructure and act as the host to the wireless display whether the wireless display is within range of the media base station's WiFi connection or whether the hosting is performed over the network infrastructure.

The current media base station is required to utilize a wired Ethernet connection for access to the LAN. The WiFi subsystem can only be used for directly supporting the wireless display or where the media base station acts as an Access Point for other wireless devices. The wireless media base station is not able to utilize the WiFi subsystem for concurrent connectivity to the Internet and connectivity to the location free TV because it lacks support for a WiFi-P mode that allows simultaneous Internet access and support for a wireless peripheral. Adding WiFi-P mode to the wireless media base station would allow full wireless support where the media base station connects wirelessly to both the wireless location free display and the wireless infrastructure.

WiFi-P for Sensors

Current sensors are designed to support different RE sensor networks but typically not WiFi. For areas that have WiFi coverage, designing sensors to support WiFi-P mode may be a good approach. In this case, each sensor does not need to fully support the complete WiFi network stack, but may respond to or initiate communication with a WiFi based host system. In other sensor systems, the sensors may wish to be part of a secure WiFi network which requires the sensors to acquire a network key.

WiFi-P Authentication

An additional use for WIN Peripheral Mode is as a means to authenticate an enrollee onto a secure WiFi network. A typical issue for secure networks is how to authenticate a new enrollee without creating a potential security hole that could be exploited to compromise the network. System security typically dictates that the authentication needs to occur prior to the enrollee having any access to the network. Without having access to the network, the authentication of a new enrollee needs to be performed "out of band"— meaning without use of the secure network. Typically, the authentication requires providing the enrollee with a key that will allow access to the network. Various prior art methods have been proposed for such a scheme including using USB for transferring the key, or requiring some type of user activation by manually coding in a pre-shared key such as with WiFi Protected Access Pre-Shared Key (WPA PSK) Mode. Some existing schemes involve the use of more than one key, where the first key gives limited access onto the network, and a second key is used as a unique identifier for the enrollee. Other multi-key schemes (such as Temporal Key Integrity Protocol (TKIP)) may also be used. The prior art means for initial key exchange, whether via USB, via manual keying or by using another out of band connection, adds user complications, may open security holes and may increase the system costs.

In one embodiment of this invention, WiFi. Peripheral Mode can be used between the host and the enrollee as an out of band channel for the passing of key information for validating first time WiFi enrollees. The host system is first used to validate an enrollee. Then the host system requests a WiFi network key on behalf of the enrollee. The host system communicates with the enrollee using the WiFi RF subsystems of both the host and enrollee, but the initial providing of the key utilizes the WiFi Peripheral Mode and is "out of band." In order to maintain proper network security, the host system needs to validate the enrollee prior to providing the key. Once the host system provides the enrollee with the network key, the enrollee becomes capable of either operating via the host system in WiFi-P mode, or the enrollee becomes capable of utilizing the provided network key to independently operate on the secure WiFi network. In another embodiment, WiFi-P mode is used in conjunction with TKIP or with Robust Secure Network (RSN) procedures to allow out of band passing of key information.

As an example of an embodiment of this invention, a temperature sensor may be added as an enrollee to a secure WiFi network. The temperature sensor has a serial number but has no user interface and no input controls (except possibly an on-off switch and a reset means). The temperature sensor is turned on and its beacon is recognized by a host system. The beacon utilizes the WiFi RF subsystem, but since the sensor does not have a network key, the host system can only communicate with the sensor using an out of band WiFi RF based protocol. A user of the host system, where the host system may be a computer or some simplified management terminal with a display and simple I/O, validates that the enrollee beacon corresponds to the serial number of the physical sensor device. Once validated, the user initiates a request via the host system for the network to validate the new enrollee. The network provides the key for the enrollee to the host system via the secure WiFi channel. The host system then provides the key to the enrollee via the out of band WiFi peripheral channel. Once the enrollee receives the key, the enrollee may utilize the WiFi RF subsystem to communicate over the secure WiFi network.

WiFi-P Network Modes

As mentioned, WiFi Ad-Hoc mode is the conventional method for WiFi devices to communicate directly with each other. Ad-Hoc mode is undesirable in this situation since a host system in Ad-Hoc mode does not have network connectivity. WiFi-P mode allows the host system to maintain network connectivity while also supporting a wireless keyboard and mouse utilizing the same WiFi subsystem. When a host system operates in WiFi-P mode, access points that are unaware of the WiFi-P mode simply view the host system as operating in standard infrastructure mode. In the case of peripherals to the host system, the router and network infrastructure may be completely unaware of the peripheral devices, may view the peripheral devices as an extension of the host system capability, or may view the host system as providing Access Point capabilities to the peripherals.

Where the peripherals are designed to only communicate with the host system, the router and network infrastructure do not need to know about the peripherals and no services need to be provided to the peripherals. The communication between the peripherals and the host system operates in the WiFi-P mode which is effectively ignored by the network. Where the peripherals may both operate in direct communication with the host system and operate on the network itself, the router may provide basic services at initialization time of the device. For example, a Dynamic Host Configuration Protocol (DHCP) server may provide the peripheral device with an IP address for use on the network.

WiFi-P Protocols

As the WiFi specifications continue to evolve with new additions, capabilities for the WiFi host system and the WiFi infrastructure devices will continue to improve. Advances such as 802.11e for QoS and 802.11 is for mesh support will enhance network capabilities. The WiFi-P mode also is designed to utilize ongoing advancements made in WiFi protocols. The WiFi-P mode can operate in any WiFi environment, although when there are fewer protocol options for the network, there may be less efficiency for the host-to-WPD communication.

In the simplest embodiment, the WPD includes a complete WiFi protocol stack and performs the required WiFi arbitration. In such a case, the AP, host system and WPD all need to run an interoperable WiFi protocol. The direct communication between the host system and the wireless peripheral utilizes the standard higher layer protocols that are part of the WiFi specification. Based on the distance between the WPD and the host system, the active power for the RF subsystem may be reduced to shorten the range. The additional optimizations for the communication between the peripheral device and the host system are to reduce the complexity of the WPD, reduce the power requirements of the WPD, and/or improve the QoS.

Even though the WPD communicates with the host system and not directly with the wireless network, all of the communication may be using the same or an overlapping WiFi RF channel. Even at lower active RF power levels, the chance exists for interference from using the same or an overlapping RF channel. Also, the host system may maintain its communication channel with the wireless network so it should not go "offline" while communicating with the WPD. With these constraints, the general methods to reduce the complexity of the wireless peripheral require that the host system perform the WiFi protocol arbitration so that the RF channel is clear for the wireless peripheral and host to communicate. With the host system managing the WiFi protocol arbitration, the WPD can essentially be in sleep mode until such time as it is in operation. The wake out of sleep mode can be initiated by either the WPD or the host system.

A general WiFi network controller 228 consists of an RF subsystem, a baseband subsystem (sometimes referred to as layer 2) and a MAC subsystem (sometimes referred to as layer 3). These layer references are not technically rigid. Other terms such as the PHY layer sometimes refer to both layer 1 and layer 2, and the MAC layer often includes functions of higher layers 4 and 5. In some systems utilizing existing technologies, albeit at a higher cost of implementation, the host system may have two non-overlapping RF channels active of which one can be used for accessing the WiFi network and the other can be used for accessing the WiFi peripheral devices. Depending on the controls available within the host system for the two channels, access to the two channels may be concurrently managed with different baseband controllers, or there may be some limitations to the ability for each channel to be used concurrently. A host system could also include two complete WiFi network controllers including the MAC where each operates on an different non-overlapping RF channel.

When the host system and the WPD communicate, since the host system has arbitrated for and controls the WiFi RF channel, the specific communication between the two can be very efficient. In a preferred embodiment, the WPD and host system use a very efficient protocol that operates below the conventional IP layer. This is sometimes called a layer 2 protocol. Instead of being based on IP addresses which are part of the network, such layer 2 protocols may be based on the unique MAC addresses of the devices. There are many ways to achieve the goal of efficient communications between the host system and WPDs and the preferred embodiments described here are just a few of the possibilities covered by the present invention.

For standardized communication between WiFi devices, the base WiFi MAC standard includes two channel access coordination functions. The simpler one is called Distributed Coordination Function (DCF) and the more complicated one is called Point Coordination Function (PCF). In the case of DCF, there is the least flexibility for the base system to provide enhanced communication between the host system and a peripheral device. However, there are a variety of QoS enhancements, as outlined in Berjano et. al's "MiFi: A Framework for Fairness and QoS Assurance in Current IEEE 802.11 Networks with Multiple Access Points" that can be utilized. In DCF mode, to support the WiFi-P mode, enhancements for supporting QoS may include one or a combination of the following techniques: modifying the DCF backoff mechanism, employing adaptive size for contention window, using different interframe spacing or various frame sizes. The WPD may wait for the host system to successfully arbitrate for the channel and then poll the WPD, or when the WPD has a pending request, it may then monitor the arbitration to determine when its host has arbitrated for a channel and initiate a request.

The PCF mode has a more robust mechanism using Contention Free Periods (CFPs) during which devices can be polled. During reserved timeslots within CFPs, the host system can more assuredly poll the WPD to either initiate a request or see if there are pending requests from the WPD. The PCF mode is an optional part of the 802.11g standard although with 802.11e there is a mandatory Hybrid Coordination Function (HCF) that provides a contention free polling mechanism much like the PCF mode. In all cases, the host system can only utilize the WiFi protocols that are available between the host system and the AP for gaining control of the channel although once the host system has the channel, the communication with the WPD may be more specific to the two devices.

Figure 2:
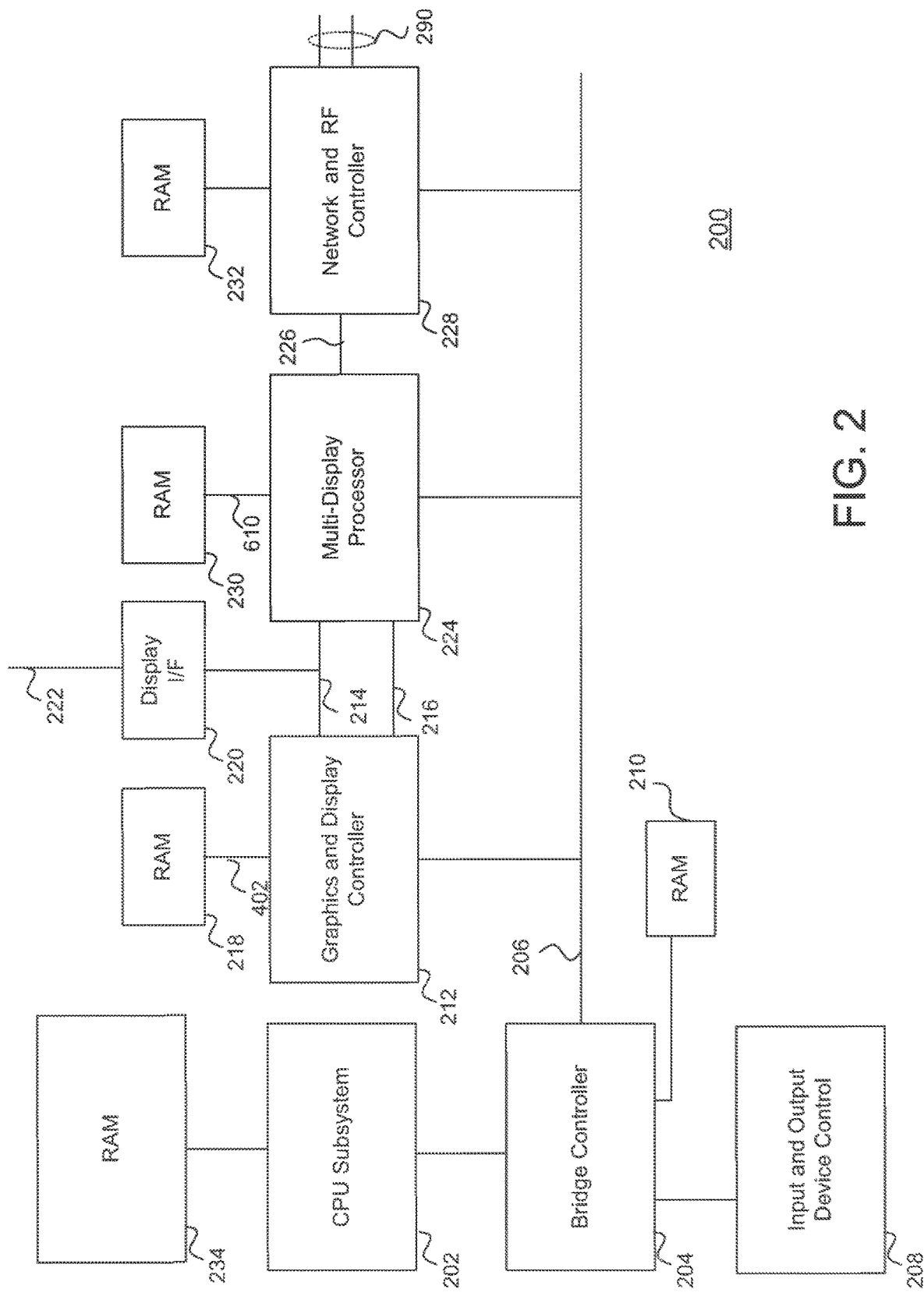
FIG. 2 is a block diagram of a host computer of a multi-display system in accordance with one embodiment of the invention.

FIG. 2 is a block diagram of a host computer 200 for a wireless peripheral system 100 in accordance with an embodiment of the invention. The basic components of host computer 200 preferably include, but are not limited to, a CPU subsystem 202, a bus bridge-controller 204, a main system bus 206 such as PCI express, local I/O 208, main RAM 210, and a graphics and display controller 212 having one or more dedicated output paths SDVO1 214 and SDVO2 216, and possibly its own memory 218. The graphics and display controller 212 may have an interface 220 that allows for local connection 222 to a local display 110. Host computer 200 also preferably includes a multi-display processor 224 that has both input paths SDVO1 214 and SDVO2 216 from the graphics and display controller 212 and an output path 226 to network controller 228. In addition to or instead of dedicated path 226, Multi-Display Processor 224 may be connected by the main system bus 206 to the Network Controller 228. The multi-display processor 224 may include a dedicated RAM 230 or may share main system RAM 210, graphics and display controller RAM 218 or network controller RAM 232. Those familiar with contemporary computer systems will recognize that the main RAM 210 may be associated more closely with the CPU subsystem 202 as shown at RAM 234. Alternatively the RAM 218 associated with the graphics and display controller 212 may be unnecessary as the host system 200 may share the main RAM 210.

Figure 8B:
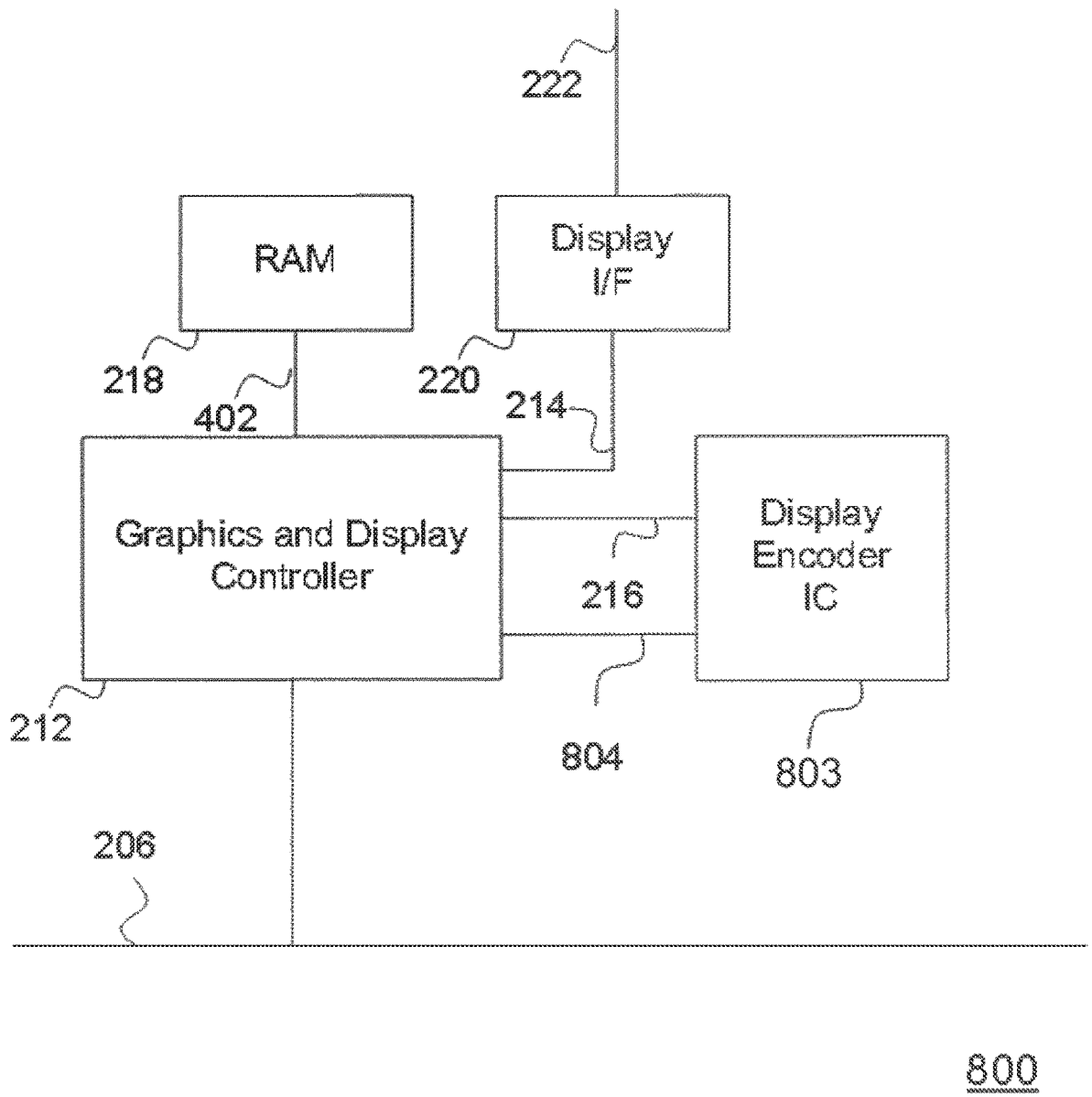
FIG. 8B is a block diagram of graphics and display system enhanced by combining a graphics and display controller with a display encoder.

The function of multi-display processor 224 is to receive one or more display refresh streams over each of SDVO1 214 and SDVO2 216, manage the individual display outputs, process the individual display outputs, track which portions of each display change on a frame-by-fame basis, encode the changes for each display, format and process what changes are necessary and then provide a display update stream to the network controller 228. The path from the multi-display processor 224 to the network controller 228 may be a direct connection 226 or a connection utilizing the main system bus 206, or the multi-display processor may feed the output back to an input port on the Graphics and Display Controller 212. In some configurations, the multi-display processor 224 does not need a connection to the main system bus 206 and all of its communications can be managed through the interfaces with the Graphics and Display Controller 212. The Graphics and Display Controller 212 may include a control bus (not shown) that can be used for programming the Multi-Display Processor 224 or the control information may be included as special control packets on the data transfer busses. The return path from the Multi-Display Processor 224 to the Graphics and Display Controller 212 may be part of a control path or may be another type of data port such as a parallel data input port, a serial data input port or some standard port such as an enhanced speed version of Consultative Committee on International Radio Standard 556 (CCIR656) or Digital Video Broadcast (DVB). FIG. 8B shows such a configuration where a Display Encoder IC 803 utilizes control and data bus 804 and does not include a connection to the main system bus 206.

Network and RF controller 228 processes the display update stream and provides the network communication over one or more network connections 290 to the various display devices. These network connections can be wired or wireless. In the case of wireless networks, a single network or a combination of wireless networks may be used. For example, host computer 200 may use UWB to wirelessly provide display data to one or more high resolution displays and may use WiFi to communicate with other peripherals.

The implementation and functionality of a multi-display system 100 are further discussed below in conjunction with FIGS. 3 through 10.

Figure 3:
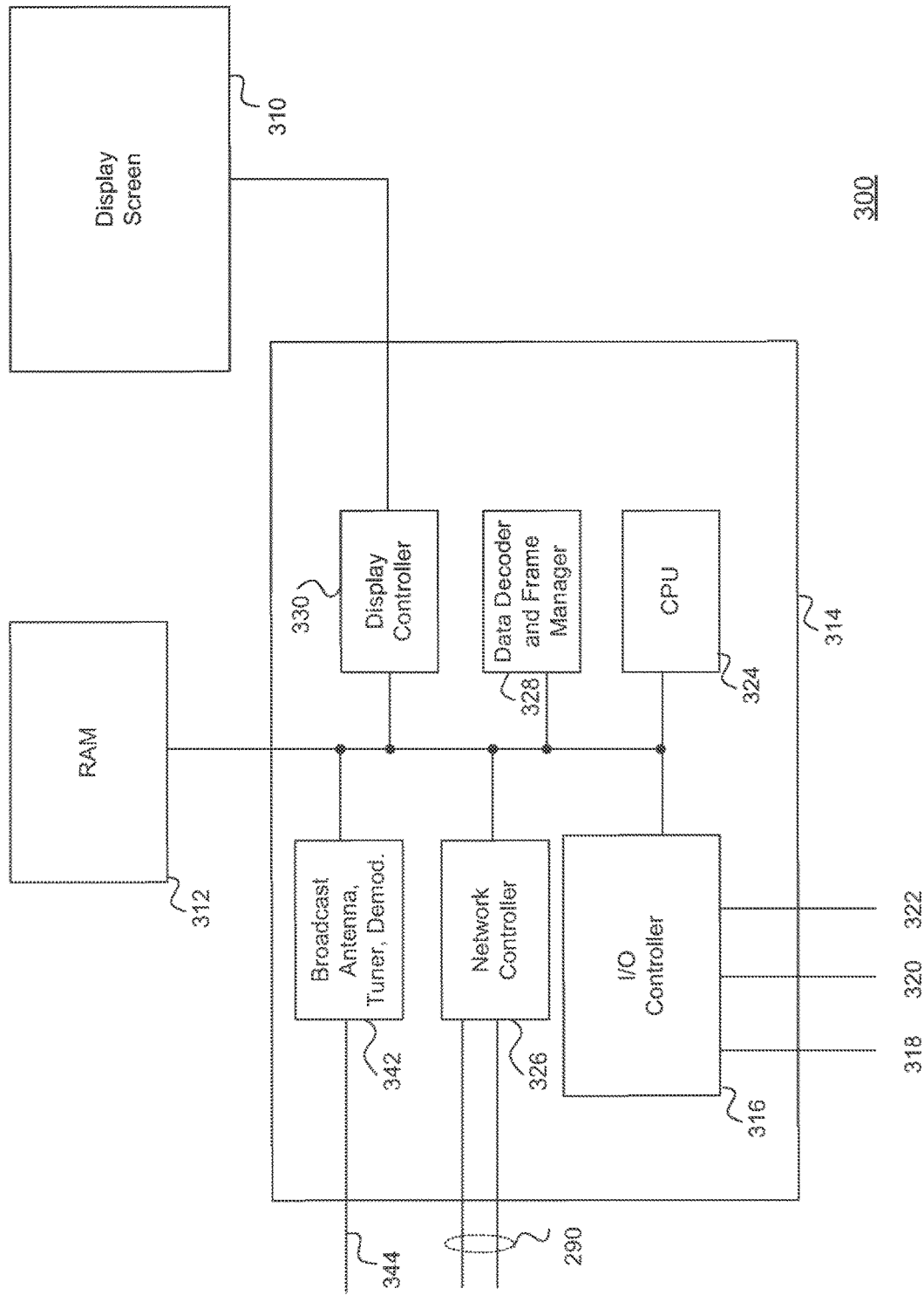
FIG. 3 shows a remote display corresponding to FIG. 2 in accordance with one embodiment of the invention.

FIG. 3 is a block diagram of a remote display system 300, in accordance with one embodiment of the invention, which preferably includes, but is not limited to, a display screen 310, a local RAM 312, and a remote display system controller 314. The remote display system controller 314 includes an I/O control subsystem 316 which has connections 318, 320 and 322 for devices that in some installations due to proximity do not connect directly to the host system. Such devices may include speakers for reproducing audio or a Universal Serial Bus (USB) connection which can support a variety of devices. The connections can be dedicated single purpose such as a PS/2 style keyboard or mouse connection, or more general purpose such as a USB. In another embodiment, the I/O could support a game controller, a local wireless connection, an IR connection or no connection at all. Remote display system 300 may also include other peripheral devices such as a DVD drive (not shown).

Also shown in FIG. 3 is an optional Broadcast Antenna, Tuner and Demodulation 342 subsystem with a connection 344 to an antenna (not shown). As a display device, it may be desirable for controller 314 to include the ability to directly receive broadcasts such as audio and video programming. The sources for such broadcasts may include Amplitude Modulation (AM) Radio, Frequency Modulation (FM) radio, digital radio, satellite radio, national Television Systems Committee (NTSC) television, Advanced Television Systems Committee (ATSC) Television, DVB-H or another form of Digital Video Broadcasting (DVB) television, cellular network based broadcasts, or a variety of other over the air broadcast transmissions. The information as to what is being tuned by this subsystem is made available to the CPU 324 and the software within the remote display system 300. This information can be relayed via the network controller 326 back to the host system 200. Some uses for such a relay are coordination of viewing preferences.

For example, a user may request to record a television broadcast based on viewing a DVB-H broadcast. Since the remote display system 300 does not include a record capability, that request is forwarded to the host system 200 to record the content. This can be done in a variety of ways including having the remote display system 300 stream the content to the host system 200 for recording, or the host system may record the content from another more local source, or the host may forward the request to another device on the network which is better suited for recording the content. The actual recording of the content may or may not be from the specific transmission type that the remote display system 300 first viewed the content with. For example, a satellite television based digital video recorder may record the same content in a high definition format even though the user selected the content based on viewing a standard definition terrestrial broadcast.

Some embodiments of the invention do not require any inputs at the remote display system 300. An example of such a system is a retail store or an electronic billboard where different displays are available at different locations and can show variety of informative and entertaining information. Each display can be operated independently and can be updated based upon a variety of factors. A similar system could also include some displays that accept touch screen inputs as part of the display screen, such as an information kiosk.

The remote display system may function as either a second display or as the primary display for a laptop PC. The laptop PC input may employ the keyboard and mouse that are an integrated part of the laptop PC, or an external keyboard and mouse that connect via USB, a proprietary RF solution, Bluetooth or WiFi. In the case of WiFi keyboards and mice, the WiFi peripheral mode described with reference to FIG. 1 can be used to allow the keyboard and mice to operate on batteries in a low power mode. Conserving battery power is a function of several factors including the active power usage while in operation, the standby power usage while not currently performing transfers, and a sleep mode while the device is in an inactive state.

A variety of network connectivity options may be supported by a remote display system 300. A common network example is Ethernet, such as CAT 5 wiring running some type of Ethernet, preferably gigabit Ethernet, where the I/O control path may use an Ethernet supported protocol such as standard Transport Control Protocol and Internet Protocol (TCP/IP), some form of lightweight handshaking in combination with User Datagram Protocol (UDP) transmissions, or a lower layer level 2 based MAC protocol. Also, a variety of wireless networking options may be supported. Referring back to FIG. 1, and considering the device labeled Wireless Peripheral 136 to be the remote display system 300 there may be a wireless path 108 directly to the host system 200, a wireless path 102 that utilizes WiFi Access Point 126, or wireless path 104 which connects to a "Remote" WiFi Access Point 120.

The wireless path 108 from the host system 200 to the wireless peripheral device 136 may be a standard WiFi link where the host system 200 acts as a link in a mesh or as an access point, it may be a dedicated wireless link which may utilize a separate WiFi channel or a different wireless standard such as Ultra Wide Band (UWB), or it may be a wireless link utilizing the WiFi-P mode. The wireless link, communication protocol and the video CODEC used can be dynamically determined based on the connections available. For example, while in close range, the host system 200 and the wireless peripheral device 136 may utilize UWB using a CODEC that matches the compression to the bandwidth available on the link. If the user moves the wireless peripheral device 136 out of range of the UWB connection, the wireless link may switch over to WiFi-P mode where the CODEC may require additional compression to fit the video transmission into the available bandwidth. The WiFi-P mode allows for some added QoS controls that may not be available when the WiFi access point 126 is included in the transfers. However, if the wireless peripheral device 136 is later out of range of the host system 200, but is still in range of the remote WIN access point 120, then the communication link may use network protocols that are supported through the network infrastructure.

In each case, if the wireless peripheral device 136 includes a display, the network carries the encoded display data required for the display where the data decoder and frame manager 328 and the display controller 330 are used to support all types of visual data representations that may be rendered at the host computer 200 and display them locally on display screen 310.

The display controller 330, data decoder and frame manager 328, and CPU 324 work together to manage a representation of the current image frame in the RAM 312 and to display the image on the display 310. Typically, the image will be stored in RAM 312 in a format ready for display, but in systems where the RAM cost is an issue, the image can be stored in the encoded format. When stored in an encoded format, in some systems, the external RAM 312 may be replaced by large buffers within the remote display system controller 314.

After the display is first initialized, the host system 200 provides a full frame of data for decode and display over the network. Following that first frame of display data, the host system 200 need only send partial frame information over the network 290 as part of the display update network stream. If none of the pixels of a display are changed from the prior frame, the display controller 330 can refresh the display screen 310 with the prior frame contents from local storage 328. When partial frame updates are sent in the display update network stream, CPU 324 and display data decoder 328 perform the necessary processing steps to decode the image data and update the appropriate area of RAM 312 with the new image. During the next refresh cycle, the display controller 330 will use this updated frame for display screen 310. The processing for conversion and storage of the display update network stream is described in further detail with reference to FIGS. 4 through 10 below.

Figure 4:
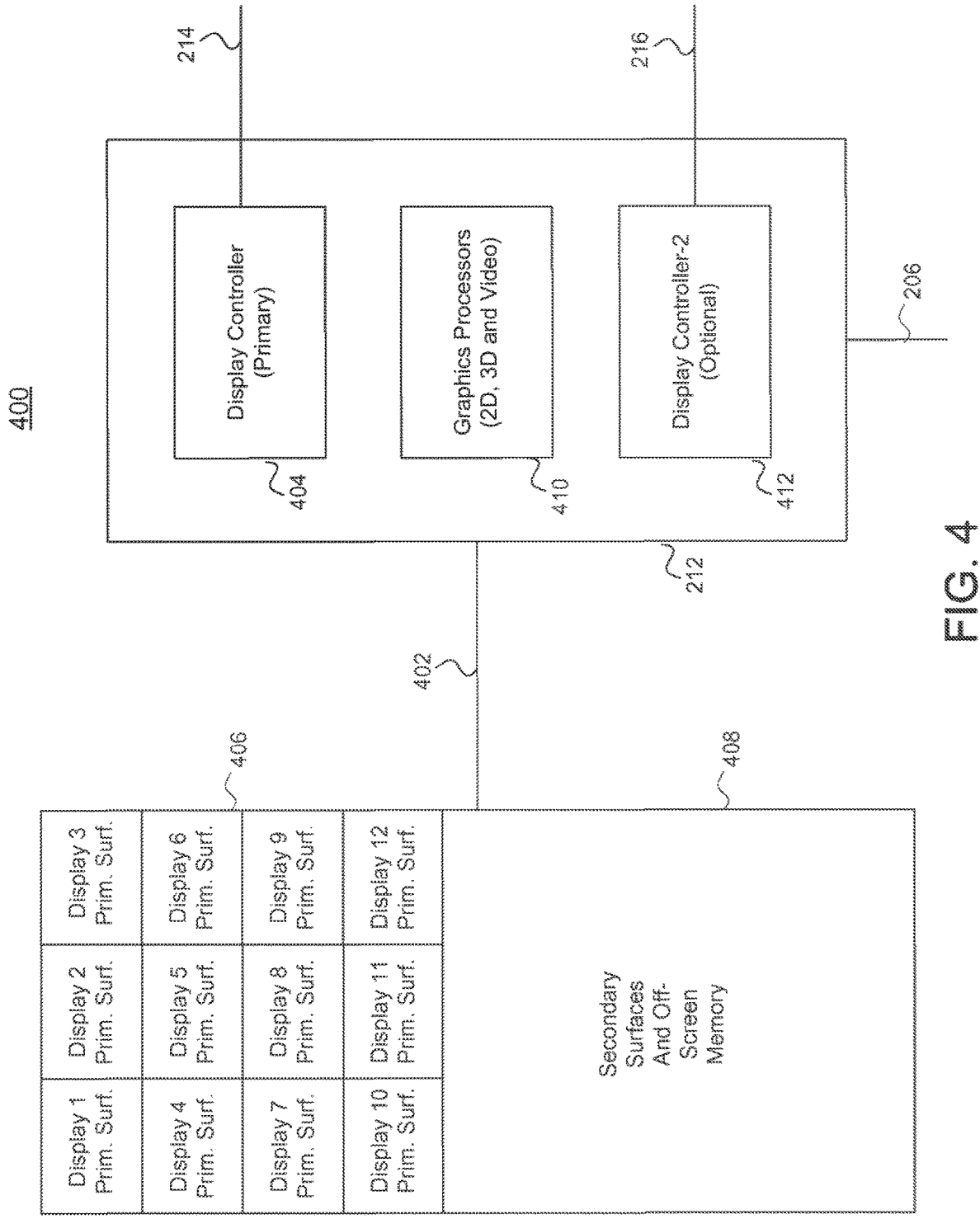
FIG. 4 represents a memory organization and the path through a dual display controller portion of a graphics and display controller in accordance with one embodiment of the invention.

An embodiment of host computer 200 may support multiple remote display systems 300, each of which may include a display system, utilizing what is conventionally associated with a single graphics and display controller 212 and a single SDVO connection. The method of multi-user and multi-display management is represented in FIG. 4 by RAM 218 data flowing through path 402 and the display controller-1 portion 404 of the graphics and display controller 212 to the output connections SDVO1 214 and SDVO2 216.

For illustration purposes, RAM 218 is shown organized into various surfaces each containing display data for multiple displays. The primary surfaces 406, Display 1 through Display 12, are illustrated with a primary surface resolution that happens to match the display resolution for each display. This is for illustrative purposes although there is no requirement for the display resolution to be the same resolution as that of the primary surface. The other area 408 of RAM 218 is shown containing secondary surfaces for each display and supporting off-screen memory. The RAM 218 will typically be a common memory subsystem for display and graphics subsystem 212, although the RAM may also be shared with main system memory 210 or with the memory of another processor in the system 100. In a shared memory system, contention may be reduced if there are available multiple concurrent memory channels for accessing the memory. The path 402 from RAM 218 to the graphics and display controller 212 may be time-shared.

The graphics and display controller 212's 2D, 3D and video graphics processors 410 are preferably utilized to achieve high graphics and video performance. The graphics processing units may include 2D graphics, 3D graphics, video encoding, video decoding, scaling, video processing and other advanced pixel processing. The display controllers 404 and 412 may also include processing units for performing functions such as blending and keying of video and graphics data, as well as overall screen refresh operations. In addition to the RAM 218 used for the primary and secondary display surfaces, there is sufficient off-screen memory to support various 3D and video operations. The display controllers will typically combine the primary surface with one or more secondary surfaces to support the display output of a composite frame, although it is also possible for the graphics processors 410 to perform the compositing into a single primary surface.

In a single-display system, display controller-1 404 would be configured to access RAM 218, process the data and output a proper display resolution and configuration over output SDVO1 214 for a single display device. Preferably, the display controller-1 404 is configured for a display size that is much larger than a single display to thereby accommodate multiple displays. Assuming the display controller-1 404 of a typical graphics and display controller 212 was not specifically designed for a multi-display system, the display controller-1 404 can typically only be configured for one display output configuration at a time. It may however be practical to consider display controller-1 404 to be configured to support an oversized single display as that is often a feature used by "pan and scan" display systems and may be just a function of setting the counters in the display control hardware.

In the illustration of FIG. 4, consider that each display primary surface represents a 1024×768 primary surface corresponding to a 1024×768 display. Stitching together six 1024×768 displays, three across and two down, would require display controller 212 to be configured to three times 1024, or 3072 pixels of width, by two times 768, or 1536 pixels of height. Such a configuration would accommodate Displays 1 through 6.

Display controller-1 404 would treat the six tiled displays as one large display and provide the scan line based output to SDVO1 output 214 to the multi-display processor 224. Where desired, display controller-1 404 would combine the primary and secondary surfaces for each of the six tiled displays as one large display. The displays labeled 7 through 12 could similarly be configured as one large display for display controller-2 412 through which they would be transferred over SDVO2 216 to the multi-display processor 224.

Figure 6:
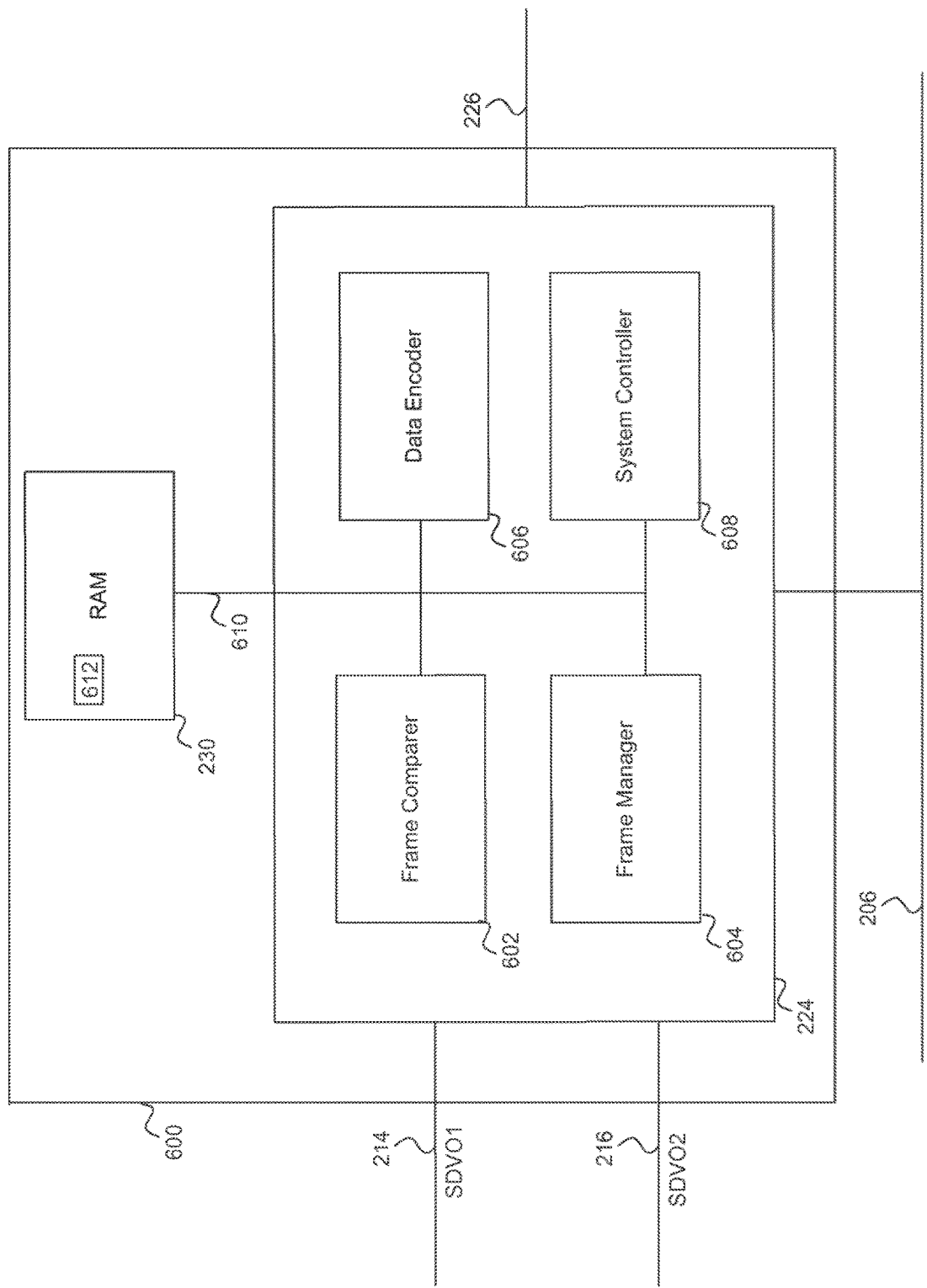
FIG. 6 shows a multi-display processor for the head end system of FIG. 2 in accordance with one embodiment of the invention.

In a proper configuration, FIG. 6 multi-display processor 224 manages the six simultaneous displays property and processes as necessary to demultiplex and capture the six simultaneous displays as they are received over SDVO1 214.

In the FIG. 4 primary surface 406, the effective scan line is three times the minimum tiled display width, making on-the-fly scan line based processing considerably more expensive. In a preferred environment for on-the-fly scan line based processing, the display controller-1 404 is configured to effectively stack the six displays vertically in one plane and treat the tiled display as a display of resolution 1024 pixels horizontally by six times 768, or 4608, pixels vertically. To the extent it is possible with the flexibility of the graphics subsystem, it is best to configure the tiled display in this vertical fashion to facilitate scan line based processing. Where it is not possible to configure such a vertical stacking, and instead a horizontal orientation needs to be included, it may be necessary to only support precinct based processing where on-the-fly encoding is not done. In order to minimize latency, when the minimum number of lines has been scanned, the precinct based processing can begin and effectively be pipelined with additional scan line inputs.

Figure 5:
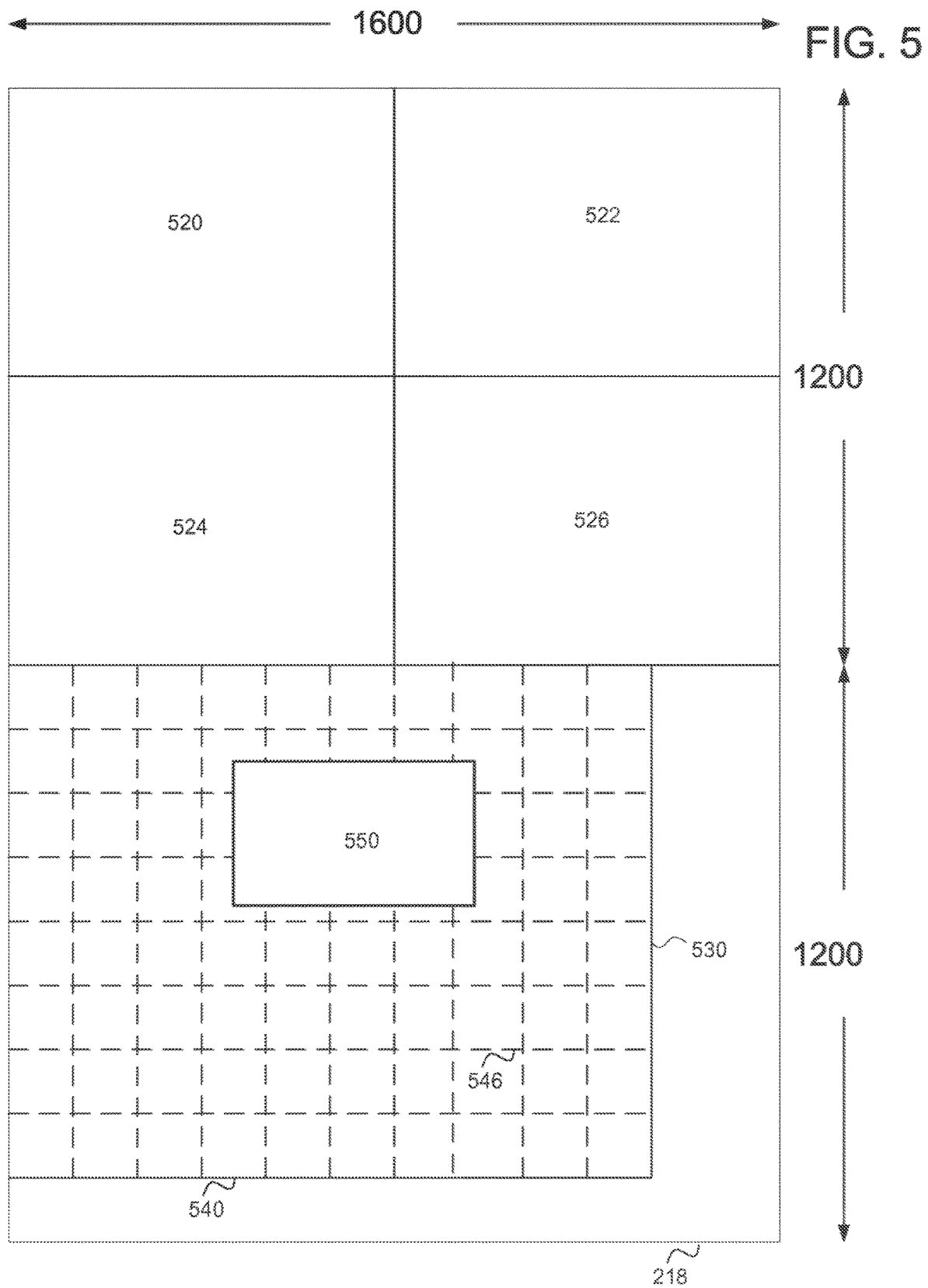
FIG. 5 represents a memory and display organization for various display resolutions in accordance with one embodiment of the invention.

FIG. 5 shows a second configuration where the tiled display is set to 1600 pixels horizontally and two times 1200 pixels or 2400 pixels vertically. Such a configuration would be able to support two remote display systems 300 of resolution 1600×1200 or eight remote displays of 800×600 or a combination of one 1600×1200 and four 800×600 displays. FIG. 5 shows the top half of memory 218 divided into four 800×600 displays labeled 520, 522, 524 and 526.

Additionally, the lower 1600×1200 area could be sub-divided to an arbitrary display size smaller than 1600×1200. As delineated with rectangle sides 530 and 540, a resolution of 1280×1024 can be supported within a single 1600×1200 window size. Because the display controller-1 404 is treating the display map as a single display, the full rectangle of 1600×2400 would be output and it would be the function of the multi-display controller 224 to properly process a sub-window size for producing the display output stream for the remote display system(s) such as system 300. A typical high quality display mode would be configured for a bit depth of 24 bits per pixel, although often the configuration may utilize 32 bits per pixel as organized in RAM 218 for easier alignment and potential use of the extra eight bits for other purposes when the display is accessed by the graphics and video processors. One example use of the extra bits may include hardware assisted tracking of which pixels or blocks of pixels have been changed.

FIG. 5 also illustrates the arbitrary placement of a display window 550 in the 1280×1024 display. The dashed lines 546 of the 1280×1024 display correspond to the precinct boundaries assuming 128×128 precincts. While in this example the precinct edges line up with the resolution of the display mode, such alignment is not necessary. As is apparent from display window 550 the alignment of the display window boundaries does not line up with the precinct boundaries. This is a typical situation as a user will arbitrarily size and position a window on a display screen. In order to support remote screen updates that do not require the entire frame to be updated, all of the precincts that are affected by the display window 550 need to be updated. Furthermore, the data type within the display window 550 and the surrounding display pixels may be of completely different types and not correlated. As such, the precinct based encoding algorithm, if it is lossy, needs to assure that there are no visual artifacts associated with either the edges of the precincts or with the borders of the display window 550. The actual encoding process may occur on blocks that are smaller, such as 16×16, than the precincts.

For wavelet based encoding schemes, the process step most likely to cause visual differences between precincts or tiles for different frames of data is the Discrete Wavelet Transform (DWT) itself. One approach to avoid the visual differences is to perform the DWT on a larger tile or on the entire image for each frame. As will be explained in detail below, the DWT results for each precinct of each frame can be used to generate the signature for each precinct to determine if that precinct needs to be re-encoded. If the precinct signature has not changed from the prior frame, then no re-encoding is necessary. For precincts where the signature has changed, the precinct data is re-encoded. Comparing signatures after the DWT has an added benefit in the case where even if the frame data has not changed, but other parameters such as the compression ratio that would affect the encoded image have changed, the post DWT signature will have changed indicating that the data for that precinct, tile or frame needs to be resent. Of course there are a variety of conditions where the frame can be reset so that the entire frame image is updated.

The illustration of the tiled memory is conceptual in nature as a view from the display controller-1 404 and display controller-2 412. The actual RAM addressing will also relate to the memory page sizes and other considerations. Also, as mentioned, the memory organization is not a single surface of memory, but multiple surfaces, typically including an RBG surface for graphics, a YUV surface for video, and an area of double buffered RGB surfaces for 3D. The display controller combines the appropriate information from each of the surfaces to composite a single image. The compositing may also include alpha blending, transparency, color keying, overlay and other similar functions to combine the data from the different planes. In Microsoft Windows XP® terminology, the display can be made up of a primary surface and any number of secondary surfaces. The FIG. 4 sections labeled Display 1 through Display 12 can be thought of as primary surfaces 406 whereas the secondary surfaces 408 are managed in the other areas of memory. Surfaces are also sometimes referred to as planes.

The 2D, 3D and video graphics processors 410 would control each of the six displays independently with each possibly utilizing a windowed user environment in response to the display requests from each remote display system 300. This could be done by having the graphics and video operations performed directly into the primary and secondary surfaces, where the display controller-1 404 composites the surfaces into a single image. Another example is to primarily use the primary surfaces and to perform transfers from the secondary surfaces to the primary surfaces. As long as the transfers are coordinated to occur at the right times, adverse display conditions associated with non-double buffered displays can be minimized. The operating system and driver software may allow some of the more advanced operations for combining primary and secondary surfaces to not be supported by indicating to the software that such advanced functions, such as transparency, are not available.

In a typical prior art system, a display controller-1 404 would be configured to produce a refresh rate corresponding to the refresh rate of a local display. A typical refresh rate may be between 60 and 85 Hz although possibly higher and is somewhat dependent on the type of display and the phosphor or response time of the physical display elements within the display. Because the graphics and display controller 212 is split over a network from the actual display device 310, screen refreshing needs to be considered for this system partitioning.

Considering the practical limitations of the SDVO outputs from an electrical standpoint, a 1600×1200×24 configuration at 76 Hz is approximately a 3.5 Gigabits per second data rate. Increasing the tiled display to two times the height would effectively double the data and would require cutting the refresh rate in half to 38 Hz to still fit in a similar 3.5 Gigabits per second data rate. Because in this configuration the SDVO output is not directly driving the display device, the refresh requirements of the physical display elements of the display devices are of no concern. The refresh requirements can instead be met by the display controller 330 of the remote display controller 314.

Though not related to the refresh rate, the display output rate for the tiled display configuration is relevant to the maximum frame rate of new unique frames that can be supported and it is one of the factors contributing to the overall system latency. Since full motion is often considered to be 30 frames per second, the example configuration discussed here at 36 Hz could perform well with regard to frame rate. Other lower frame rates can also be supported even though they are not full motion. In general, the graphics and video drawing operations that write data into the frame buffer are not aware of the refresh rate at which the display controller is operating. Said another way, the refresh rate is software transparent to the graphics and video drawing operations.

Each display refresh stream output on SDVO1 214 includes data to indicate which display is the target recipient of the update and where within the display (which precincts for systems that are precinct based) the new updated data is intended for, and includes the encoded data for the display.

Note that in FIG. 5, the window indicated by box 550 does not align with the drawn precincts and may or may not align with blocks of a block-based encoding scheme. Some encoding schemes will allow arbitrary pixel boundaries for an encoding subframe. For example, if the window 550 utilizes text and the encoding scheme utilized RLE encoding, the frame manager can set the sub-frame parameters for the window to be encoded to exactly the size of the window. When the encoded data is sent to the remote display system, it will also include both the window size and a window origin so that the data decoder and frame manager 328 can determine where to place the decoded data into a decoded frame.

If the encoding system used does not allow for arbitrary pixel alignment, then the pixels that extend beyond the highest block size boundary either need to be handled with a pixel-based encoding scheme, or the sub-frame size can be extended beyond the window 550 size. The sub-frame size should only be extended if the block boundary will not be evident by separately compressing the blocks that extend beyond the window.

Assuming window 550 is generated by a secondary surface overlay, the software tracking layer can be useful for determining when changes are made to subsequent frames. Even though the location of the secondary surface is known, because of various overlay and keying possibilities, the data to be encoded should come from a/the stage after the overlay and keying steps are performed by either one of the graphics engines or by the display processor.

FIG. 6 is a block diagram of the multi-display processor subsystem 600 which includes the multi-display processor 224 and the RAM 230 and other connections 206, 214, 216 and 226 from FIG. 2. The representative units within the multi-display processor 224 include a frame comparer 602, a frame manager 604, a data encoder 606, and system controller 608. These functional units are representative of the processing steps performed and could be performed by a multi-purpose programmable solution, a DSP or some other type of processing hardware.

Though the preferred embodiment is for multiple displays, for the sake of clarity, this disclosure will first describe a system with a single remote display screen 310. For this sample remote display, the remote display system 300, the graphics and display controller 212 and the multi-display processor 224 are all configured to support a common display format typically defined as a color depth and resolution. Configuration is performed by a combination of existing and enhanced protocols and standards including Digital Display Control (DDC), and Universal Plug and Play (uPNP), and utilizing the multi-display support within the Windows® or Linux® operating systems, and may be enhanced by having a management setup and control system application. Other newer standards such as Display Port and Unified Display Interface (UDI) have additional protocols to query and set up the display device.

The graphics and display controller 212 provides the initial display data frame over SDVO1 214 to the multi-display processor 224 where the frame manager 604 stores the data over path 610 into the user display portion 612 of memory 230. Frame manager 604 keeps track of the display and storage format information for the frames of display data. When the subsequent frames of display data are provided over SDVO1 214, the frame comparer 602 compares the subsequent frame data to the just prior frame data already stored in RAM 230. The prior frame data is read from RAM over path 610. The new frame of data may either be compared as it comes into the system on path 214, or may be first stored to memory by the frame manager 604 and then read by the frame comparer 602. Performing the comparison as the data comes in saves the memory bandwidth of an additional write and read to memory and may be preferred for systems where memory bandwidth is an issue. This real time processing is referred to as "on the fly" and may be a preferred solution for reduced latency.

The frame compare step identifies which pixels and regions of pixels have been modified from one frame to the next. The comparison of frames is performed by either comparing the actual pixels or by comparing a signature of a region of pixels and the tracking of the changes from one frame to the next is typically performed at the higher region granularity. This higher granularity makes the management of the frame differences more efficient. In one embodiment, a fixed grid of 128×128 pixels, referred to as a precinct, may be used for tracking changes from one frame to the next. In other systems the precinct size may be larger or smaller, and instead of square precincts, the tracking can also be done on the basis of a rectangular region, scan line or a group of scan lines. The block granularity used for compression may be a different size than the precinct and they are somewhat independent although the minimum precinct size would not likely be smaller than the block size.

The frame manager 604 tracks and records which precincts or groups of scan lines of the incoming frame contain new information and stores the new frame information in RAM 230, where it may replace the prior frame information and as such will become the new version of prior frame information. Thus, each new frame of information is compared with the prior frame information by frame comparer 602. The frame manager 604 also indicates to the data encoder 606 and to the system controller 608 when there is new data in some of the precincts and which ones those precincts are. From an implementation detail, the new data may be double-buffered to assure that data encoder 606 accesses are consistent and predictable. In another embodiment where frames are compared on the fly, the data encoder may also compress data on the fly. This is particularly useful for scan line and multi-scan line based data compression.

For block based data encoding the data encoder 606 accesses the modified precincts of data from RAM 230, or large internal buffers, and compresses the data. System controller 608 keeps track of the display position of the precincts of encoded data and manages the data encoding such that a display update stream of information can be provided via the main system bus 206 or path 226 to the network controller. Because the precincts may not correspond to any particular display surface, in the preferred embodiment any precinct can be independently encoded without concern for creating visual artifacts between precincts or on the edges of the precincts. However, depending on the type of data encoding used, the data encoder 606 may require accessing data beyond the changed precincts in order to perform the encoding steps. Therefore, in order to perform the processing steps of data encoding, the data encoder 606 may access data beyond just the precincts that have changed. Lossless encoding systems should not have a problem with precinct edges.

A further enhanced system does not need to store the full prior frame in order to compare on-the-fly. Consider a system that includes eight line buffers for the incoming data and contains storage for a signature associated with each eight lines of the display from the prior frame. A signature is a calculated number that is generated through some hashing of a group of data. While the original data can not be reconstructed from the signature, the same input data will always generate the same signature, whereas any change to any of the pixels of the input data will generate a different signature. Using 20 bits for a signature gives two raised to the twentieth power, or about one million, different signature possibilities. This means there would be about a one in a million chance of an incorrect match. The number of bits for the signature can be extended further if so desired.

The signature may be generated in conjunction with or separate from the path used for the encoding. As mentioned above, the signature generation may also be performed in conjunction with one of the steps of the encoding process such as using the DWT output for signature generation. In one implementation, each scan line is encoded on the fly using the prior seven incoming scan lines and the data along the scan line as required by the encoding algorithm. As each group of eight scan lines is received, the signature for that group is generated and compared to the signature of those same eight lines from the prior frame. If the signature of the new group of eight scan lines matches the signature of the prior frame's group of eight scan lines, then it can be safely assumed that there has been no change in display data for that group of scan lines, and the system controller 608 can effectively abort the encoding and generation and transmission of the display update stream for that group of scan lines. If after receiving the eight scan lines, the signatures for the current frame and the prior frame are different, then that block of scan lines contains new display data and system controller 608 will encode the data and generate the display update stream information for use by the network controller 228 in providing data for the new frame of a remote display.

The signature generation can be done with minimal buffering of the data where each pixel, or group of pixels, contributes to the signature and is no longer needed for the signature operation. However, the pixel data may still be needed if the pixels need to be encoded. Since the result of the signature will not be known until after the signature has been completed on the complete block of data, the incoming pixels cannot be discarded until the result of the signature comparison is known. The pixel data can be stored in buffer memory either on-chip or off-chip. In one optimization to conserve memory bandwidth, the pixels can be buffered on-chip and only if the signature does not match, then the pixels are transferred to the off-chip memory. The internal memory may be double buffered so that while the first buffer is being transferred to main memory for encoding, the second buffer is receiving the next group of pixels for the next signature operation.

In order to improve the latency, the encoding and signature generation and comparison may be partially overlapped or done in parallel. In one system the encoding of the data is performed from the pixels stored in an internal buffer memory. Such a system may use double or multi-way buffering with either line buffers or with another memory arrangement. As mentioned, one of the initial encoding processing steps may be used as part of the process for signature generation. If the original data will not be required for the full encoding, the resulting output of that initial processing step may be stored instead of the initial data.

When the prior frame data is not used in the encoding, the encoding step uses one of any number of existing or enhanced versions of known lossy or lossless two dimensional compression algorithms, including but not limited to Run Length Encoding (RLE), Wavelet Transforms, Discrete Cosine Transform (DCT), Vector Quantization (VQ) and Huffman Encoding. Different types of content benefit to different extents based on the chosen encoding scheme. For example, frames of video images contain varying colors but not a lot of sharp edges, which is fine for DCT based encoding schemes, whereas text includes a lot of white space between color changes but has very sharp edge transitions that need to be maintained for accurate representation of the original image and thus DCT would not be the most efficient encoding scheme. The amount of compression required will also vary based on various system conditions such as the network bandwidth available and the resolution of the display.

For systems that include the prior frame data as part of the encoding process, more sophisticated three dimensional compression techniques can be used where the third dimension is the time domain of multiple frames. Such enhancements for time processing include various block matching and block motion techniques which can differ in the matching criteria, search organization and block size determination.

While the discussion of FIG. 6 primarily described the method for encoding data for a single display, FIG. 6 also indicates a second display input path SDVO2 216 that can perform similar processing steps for a second display input from a graphics and display controller 212, or from a second graphics and display controller (not shown). An advanced graphics and display controller 212 is designed with dual SDVO outputs in order to support dual displays for a single user or to support very high resolution displays where a single SDVO port is not fast enough to handle the necessary data rate. The processing elements of the multi-display processor 224 including the frame comparer 602, the frame manager 604, the data encoder 606 and the system controller 608 can either be shared between the dual SDVO inputs, or a second set of the needed processing units can be included. If the processing is performed by a programmable DSP or Media Processor, either a second processor can be included or the one processor can be time multiplexed to manage both inputs.

The multi-display processor 224 outputs a display update stream to the FIG. 2 network controller 228 which in turn produces a display update network stream at one or more network interfaces 290. The networks may be of similar or dissimilar nature but through the combination of networks, each of the remote display systems, such as display system 300, is accessible. High speed networks such as Gigabit Ethernet are preferred but are not always practical. Lower speed networks such as 10/100 Ethernet, Power Line Ethernet, Coaxial cable based Ethernet, phone line based Ethernet or wireless Ethernet standards such as 802.11a, b, g, n, s and future derivatives can also be supported. Other non-Ethernet connections are also possible and can include USB, 1394a, 1394b, 1394c or other wireless protocols such as Ultra Wide Band (UWB) or WiMAX.

The various supported networks can support a variety of transmission schemes. For example, Ethernet typically supports protocols such as standard Transport Control Protocol and Internet Protocol (TCP/IP), UDP, some form of lightweight handshaking in combination with UDP transmissions or a layer 2 based protocol. The performance of the network connection will be one of the critical factors in determining what resolution, color depth and frame rate can be supported for each remote display system 300. Depending on the constraints of the network environment, a proprietary protocol at an even lower level may be used. For example, a layer 2 protocol that does not use IP may perform an efficient transfer. Such a transfer may make use of the MAC addresses of the different devices. Special care needs to be taken with any routers and other network equipment to ensure such a scheme will work reliably in the network topology being used.

The remote display performance can be optimized by matching the network performance and the display encoding dynamically in real time. For example, if the network congestion on one of the connections for one of the remote display systems increases at a point in time, the multi-display processor can be configured dynamically to reduce the data created for that remote display. When such a reduction becomes necessary, the multi-display processor can reduce the display stream update data in various ways with the goal of having the least offensive effect on the quality of the display at the remote display system. Typically, the easiest adjustment is to lower the frame rate of display updates.

It is not typically possible or desirable to dynamically adjust the set-up of display resolution mode or display color depth mode of the remote display system as it would require a reconfiguration of the display and the user would clearly find such an adjustment objectionable. However, depending on the data encoding method used, the effective resolution and effective color depth within the existing display format can be adjusted without the need to reconfigure the display device and with a graceful degradation of the display quality.

Graceful degradation of this kind takes advantage of some of the characteristics of the human visual system's psycho-visual acuity where, when there are more changes and motion in the display, the psycho visional acuity is less sensitive to the sharpness of the picture. For example, when a person scrolls through a text document, his eye cannot focus on the text as well as when the text is still, so that if the text blurred slightly during scrolling, it would not be particularly objectionable. Since the times of the most display stream updates correspond to the added motion on the display, it is at those times it may be necessary to reduce the sharpness of the transmitted data in order to lower the data rate. Such a dynamic reduction in sharpness can be accomplished with a variety of encoding methods, but is particularly well suited for Wavelet Transform based compression where the image is subband coded into different filtered and scaled versions of the original image.

Multi-display processor 224 will detect when a frame input over the SDVO bus intended for a remote display system is unchanged from the prior frame for that same remote display system. When the frame comparer 602 detects such a sequence of unchanged frames, the data encoder 606 does not need to perform any encoding for that frame, the network controller 228 will not generate a display update network stream for that frame, and the network bandwidth is conserved as the data necessary for displaying that frame already resides in the RAM 312 at the remote display system 300. Similarly, no encoding is performed and no network transmission is performed for identified precincts or groups of scan lines that the frame manager 604 and frame comparer 602 are able to identify as unchanged. However, in each of these cases, the data was sent over the SDVO bus and may have been stored and read from RAM 230.

These SDVO transmissions and RAM movements would not be necessary if the host computer 200 were able to track which display frames are being updated. Depending on the operating system it is possible for the CPU 202 to track which frames for which displays are being updated. There are a variety of software based remote display Virtual Network Computing (VNC) products which use software running on the host system CPU 202 to reproduce the look of the display of a computer and can support viewing from a different type of platform and over low bandwidth connections. While conceptually interesting, this approach does not mimic a real time response or support multi-media operations such as video and 3D that can be supported by this preferred embodiment. However, a preferred embodiment of this invention can use software, combined with the multi-display processor hardware, to enhance the overall system capabilities.

VNC systems typically perform the operations of the graphics drawing engines using software on the host system CPU 202 because utilizing the graphics and display controller 212 to perform the graphics drawing operations would then require the CPU 202 to read back the resulting frames from the RAM 218 which would typically be inefficient. In one preferred embodiment of this invention, the multi-display processor 224, through a combination of hardware and software, can perform the equivalent functions of the VNC encoding software and allow a VNC software client to remotely view the accelerated frame buffer output produced by graphics and display controller 212. VNC typically supports Hextile encoded, ZRLE encoded and raw non-encoded formats and may include 8, 64, 256 and full color options.

In some systems, the display encoding capabilities of the multi-display processor 224 may be integrated into the network controller 228 or into another part of the host system. As such, the display data ports 214 and 216 may not be available. In such a case, the main system bus 206 may be used to transfer the display frames or sub frames. The Graphics and Display Controller 212 would be configured to provide access to the display frame data or would transfer the display frame data to another part of the system over the main system bus 206. The display encoding function would then be performed on the display frame data by either dedicated hardware or a programmable processor. In one preferred embodiment of this invention, the network controller includes a programmable processor capable of performing the VNC Hextile, ZRLE and wavelet based encoding techniques. The Graphics and Display Controller 212 provides the display frame data either over the main system bus 206 or via a more dedicated bus 216. The processor within the network controller (performs the display encoding and then via the network control functions provides the encoded display data over a network to either a VNC client or to another remote display controller.

Various versions of Microsoft Windows® operating systems use Graphics Device Interface (GDI) calls for operations to the Graphics and Display Controller 212. Similarly, there are direct draw calls for controlling the primary and secondary surface functions, direct 3D calls for controlling the 3D functions, and direct show calls for controlling the video playback related functions. Providing a tracking software layer that either intercepts the various calls, or utilizing other utilities within the display driver architecture, can enable the CPU subsystem 202 to track which frames of which remote display system are being updated. By (performing this tracking, the CPU can reduce the need to send unchanged frames over the SDVO bus. It would be further advantageous if the operating system or device driver support provided more direct support for tracking which displays, which frames and which precincts within a frame had been modified. This operating system or device driver information could be used in a manner similar to the method described for the tracking software layer.

In a preferred embodiment, the CPU 202 can process data for more remote display systems than the display control portion of the graphics and display controller 212 is configured to support at any one time. For example, in the tiled display configuration for twelve simultaneous remote display systems of FIG. 4, additional displays could be swapped in and out of place of displays one through twelve based on the tracking software layer. If the tracking software detected that no new activity had occurred for display 5, and that a waiting list display 13 (not shown) had new activity, then CPU 202 would swap display 13 into the place of display 5 in the tiled display memory area. CPU 202 may use the 2D processor of the 2D, 3D and video graphics processors 410 to perform the swapping. A waiting list display 14 (not shown) could also replace another display such that the twelve shown displays are essentially display positions in and out of which the CPU 202 can swap an arbitrary number of displays. The twelve position illustration is arbitrary and the system 100 could use as few as one or as many positions as the mapping of the display sizes allows.

There are several considerations for using a tracking software layer for such a time multiplexing scheme. The display refresh operation of display controller-1 404 is asynchronous to the drawing by the 2D/3D and video processors 410 as well as asynchronous to the CPU 202 processes. This asynchronous nature makes it difficult for the multi-display processor 224 to determine from the SDVO data if a display in the tiled display memory is the pre-swap display or the post-swap display. Worse, if the swap occurred during the read out of the tiled display region being swapped, it would be possible for corrupted data to be output over SDVO. Synchronizing the swapping with the multi-display processor 224 will require some form of semaphore operation, atomic operation, time-coordinated operation or software synchronization sequence.

The general software synchronization sequence is to inform the multi-display processor 224 that the display in (to use the example just above) position 5 is about to b swapped and to not use the data from that position. The multi-display processor could still utilize data from any of the other tiled display positions that were not being swapped. The CPU 202 and 2D/3D and video processor 410 will update the tiled display position with the new information for the swapped display. CPU 202 then informs the multi-display processor 224 that data during the next SDVO tiled display transfer would be from the new swapped display and can be processed for the remote display system associated with the new data. Numerous other methods of synchronization, including resetting the display controller-1 404 to utilize another area of memory for the display operations, are possible to achieve swapping benefits of supporting more users than there are hardware display channels at any one time.

As described, it is possible to support more remote display systems 300 than there are positions in the tiled display 406. The synchronization operations will take away some of the potential bandwidth for display updates, but overall, the system will be able to support more displays. In particular, one could consider a system 100 where many remote displays have little or no activity. In another system, where many of the remote displays do require frequent updates, the performance for each remote display would be gracefully degraded through a combination of reduced frame rate and reducing the visual detail of the content within the display. If the system only included one display controller-1 404, the group of six displays, 1 through 6, could be reconfigured such that the display controller would utilize the display memory associated with the group of six displays 7 through 12 for a time, then be switched back.

The tiled method typically provides for the graphics and display controller 212 providing the multi-display processor 224 with the complete frame information for each tile. There is also the ability to provide sub-frame information via this tile approach provided that the sub-frame information relating to the position information of the subframe is also provided. In a sub-framed method, instead of a complete frame occupying the tile, a number of subframes that can fit are fit into the same area. Those sub-frames can all relate to one frame or relate to multiple frames.

Another method to increase the number of remote displays supported is to bank switch the entire tile display area. For example, tiles corresponding to displays 1 through 6 may be refreshed over the SDVO1 214 output while tiles corresponding to displays 7 through 12 are being drawn and updated. At the appropriate time, a bank switch occurs and the tiles for displays 7 through 12 become the active displays and tiles for displays 1 through 6 are then redrawn where needed. By switching all of the tiles in a bank at once, the number of synchronization steps may be fewer than by switching each display independently.

To recap, by configuring and combining at a system level, the graphics display controller 212 with a multi-display processor 224 is able to support configurations varying in the number of remote display systems, resolution and color depth for each display, and the frame rate achievable by each display. An improved configuration could include four or more SDVO output ports, and combined with the swapping procedure, could increase the ability of the system to support even more remote display systems at higher resolutions. However, increasing the overall SDVO bandwidth and using dedicated memory and swapping for the multi-display processor comes at an expense in both increased system cost and potentially increased system latency.

Figure 7:
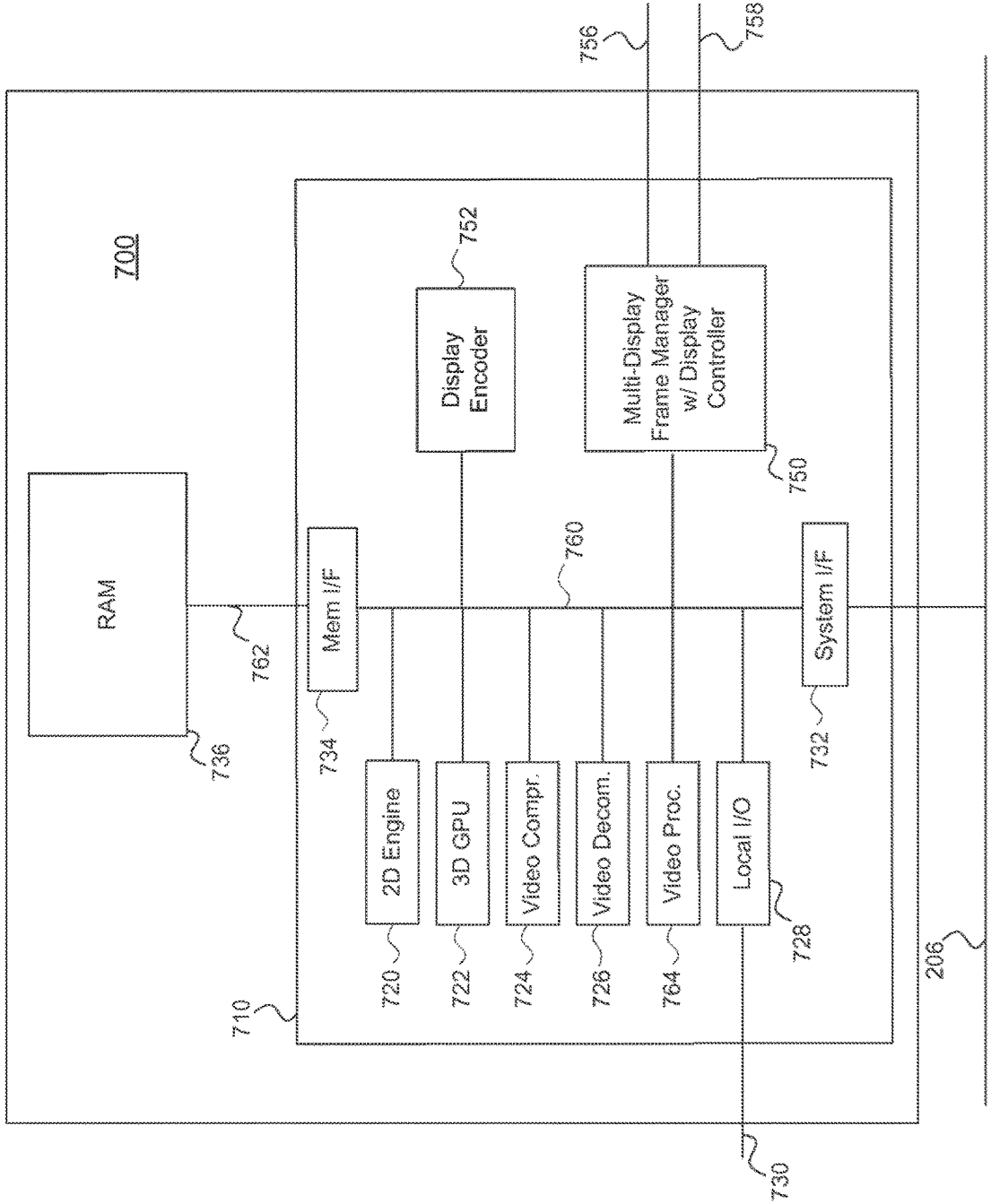
FIG. 7 is a block diagram of an exemplary graphics controller with an integrated multi-display support in accordance with one embodiment of the invention.

In an enhanced embodiment, not appropriate for all systems, it is desirable to combine the multi-display processor with the system's graphics and video display controller and share the same memory subsystem. FIG. 7 shows a preferred System-On-Chip (SOC) integrated circuit embodiment 700 that combines the multi-user display capabilities along with what is typically referred to as a graphics controller in a computer system. The combined graphics controller with integrated multi-display support 710 incorporates the functions of both graphics and display controller 212 and multi-display processor 224 and as such this combined SOC would also connect to main system bus 206 in the host computer 200 of a multi-display system 100 (FIG. 1).

In a preferred embodiment, the SOC graphics controller with integrated multi-display support 710 includes a 2D Engine 720, 3D Graphics Processing Unit (GPU) 722, a system interface 732 such as PCI express, control for local I/O 728 that can include interfaces 730 for video or other local I/O, such as a direct interface to a network controller, and a memory interface 734. Additionally, the graphics controller may include some combination of video compressor 724 and video decompression 726 hardware, or some form of programmable video processor 764 that combines those and other video related functions.

While an embodiment can utilize the software driven GPU and video processor approach for multi-display support as described above, the performance of the system as measured by the frame rates for the number of remote displays will be highest when using a graphics controller that includes a display subsystem optimized for multi-display processing. This further preferred embodiment 700 (FIG. 7) includes a multi-display frame manager with display controller 750 and a display data encoder 752 that compresses the display data. The multi-display frame manager with display controller 750 may include outputs 756 and 758 for local displays, although the remote multi-display aspects are supported over the system interface 732 or potentially a direct connection 730 to the network controller. The system bus 760 is illustrative of the connections between the various processing units as well as the system interface 732 and memory interface 734. The system bus 760 may include various forms of arbitrated transfers and may also have direct paths from one unit to another for enhanced performance.

The multi-display frame manager with display controller 750 supports functions similar to the FIG. 6 Frame Manager 604 and Frame Comparer 602 of multi-display processor 224. By way of being integrated with the graphics subsystem, some of the specific implementation capabilities improve, although the previously described functions of managing the multiple display frames in memory, determining which frames have been modified by the CPU, running various graphics processors and video processors, and managing the frames or blocks within the frames to be processed by the display data encoder 752 are generally supported.

In another embodiment of the present invention, the SOC graphics controller with integrated multi-display support 710 supports remote clients that utilize a VNC type interface. To provide such support, the display encoder 752 or another hardware block or CPU within integrated multi-display support 710 performs some or all of the encoding typically performed by the host CPU 210. An enhanced VNC client can utilize both the traditional VNC commands as well as include decoding support for encoding enhancements that are supported within SOC 710. Such an approach can allow both remote display systems 300 and remote PCs to perform remote computing tasks via the host system 200.

In the FIG. 2 multi-chip approach of host computer 200, the graphics and display controller 212 is connected via the SDVO paths to the multi-display processor 224, and each controller and processor has its own RAM system. Conversely, in FIG. 7 the graphics controller with integrated multi-display support 710 uses the shared RAM 736 connected by line 762 instead of the SDVO paths. Using the RAM 736 eliminates or reduces several bottlenecks in the system. First, the SDVO path transfer bandwidth issue is eliminated. Second, by sharing the memory, the multi-display frame manager with display controller 750 is able to read the frame information directly from the memory thus eliminating the read of memory by the graphics and display controller 212. For systems where the multi-display processor 224 was not performing operations on the fly, a write of the data into RAM is also eliminated.

Host computer 200 allows use of a graphics and display controller 212 that may have not been designed for a multi-display system. Since the functional units within the graphics controller with integrated multi-display support 710 may all be designed to be multi-display aware, additional optimizations can also be implemented. In a preferred embodiment, instead of implementing the multi-display frame support with a tiled display frame architecture, the multi-display frame manager with display controller 750 may be designed to map support for multiple displays that are matched as far as resolution and color depth in their corresponding remote display systems.

By more directly matching the display in memory with the corresponding remote display systems, the swapping scheme described above can be much more efficiently implemented. Similarly, the tracking software layer described earlier could be assisted with hardware that tracks when any pixels are changed in the display memory area corresponding to each of the displays. However, because a single display may include multiple surfaces in different physical areas of memory, a memory controller-based hardware tracking scheme may not be the most economical choice.

In one embodiment of the present invention where hardware assisted tracking is utilized, the 2D engine 720, the 3D GPU 722 and the other video units that might change the display pixels utilize a memory based bit scheme to set which pixels have been changed. The display encoder 752 can be used to reset the tracking bit each time the pixels have been encoded. This type of setting and resetting of a tracking bit can be combined with double buffering of surfaces. The tracking bits can be allocated for each pixel, or for a block of pixels. The bits can be stored in memory in proximity with the corresponding pixels or blocks of pixels, or a separate memory surface may be used for the tracking bits. The hardware utilized by the 3D GPU 722 for setting the Z-buffering bit depths or some other similarly designed hardware may be one way to implement such a hardware assisted tracking mechanism.

The tracking software layer can also be used to assist in the encoding choice for display frames that have changed and require generation of a display update stream. As discussed above the encoding is performed to reduce the data required for the remote display system 300 to regenerate the display data generated by the host computer's graphics and display controller 212. The tracking software layer can help identify the type of data within a surface where the display controller-1 404 translates the surface into a portion of the display frame. That portion of the display frame, whether precinct based or scan line based encoding is used, can be identified to the data encoder 606, or display data encoder 752, as to allow the most optimal type of encoding to be performed.

For example, if the tracking software layer identifies that a surface is real time video, then an encoding scheme more effective for video, which has smooth spatial transitions and temporal locality, can be used for those areas of the frame. If the tracking software layer identifies that a surface is mostly text, then an encoding scheme more effective for the sharp edges and the ample white space of text can be used. Identifying what type of data is in what region is a complicated problem. However, this embodiment of a tracking software layer allows an interface into the graphics driver architecture of the host display system and host operating system that assists in this identification. For example, in Microsoft Windows®, a surface that utilizes certain Direct-Show commands is likely to be video data whereas a surface that uses color expanding bit block transfers (Bit Blits) normally associated with text, is likely to be text. Each operating system and graphics driver architecture will have its own characteristic indicators. Other implementations can perform multiple types of data encoding in parallel and then, based on encoder feedback, choose to use the encoding scheme that produces the best results.

Some types of encoding schemes are particularly more useful for specific types of data, and some encoding schemes are less susceptible to the type of data. For example, RLE is very good for text and very poor for video, DCT based schemes are very good for video and very poor for text, and wavelet transform based schemes can do a good job for both video and text. The VNC Hextile and ZRLE encoding techniques can be further combined with other encoding schemes for blocks that do not lend themselves to Hextile and ZRLE. For example, if a block can not be sufficiently encoded with Hextile, then that block may be encoded using a Wavelet based scheme. Although any type of lossless or lossy encoding can be used in this system, wavelet transform encoding, which also can be of a lossless or lossy type, for this application has been described in some detail. While optimizing the encoding based on the precinct is desirable, it can not be used where it will cause visual artifacts at the precinct boundaries or create other visual problems.

FIG. 8A illustrates the process of converting from a frame of video through to the communication processor. The first step is for each component of the video to be decomposed via subband encoding into a multi-resolution representation. The quad-tree-type decomposition for the luminance component Y is shown in 812, for the first chrominance component U in 814 and for the second chrominance component V in 816. The quad-tree-type decomposition splits each component into four subbands where the first subband is represented by 818(h) 818(d) and 818(v) with the h, d and v denoting horizontal, diagonal and vertical. The second subband, which is one half the first subband resolution in both the horizontal and vertical direction, is represented in 820(h), 820(d) and 820(v). The third subband is represented by 822(h), 822(d) and 822(v) and the fourth subband by box 824. Forward Error Correction (FEC) is an example of a method for improving the error resilience of a transmitted bitstream. FEC includes the process of adding additional redundant bits of information to the base bits such that if some of the bits are lost or corrupted, the decoder system can reconstruct a complete, or nearly complete, representation of the frame. The more bits of redundant information that are added during the FEC step, the more strongly protected, and the more resilient to errors the bit stream will be. In the case of the wavelet encoded video, the lowest resolution subbands of the video frame may have the most image energy and can be protected via more FEC redundancy bits than the higher resolution subbands of the frame.

In a typical network system, the FEC bits are used to protect a complete packet of information where each packet is protected by a checksum. When the checksum properly arrives at the receiving end of a network transmission, the packet of information can be assumed to be correct and the packet is used. When the checksum arrives improperly, the packet is assumed to be corrupted and is not used. If packets of critical information are corrupted, the network protocol may re-transmit them. For video, retransmission should be avoided as by the time a retransmitted packet is sent, it may be too late to be of use. Adding the associated data traffic of retransmission can worsen a corrupted packet situation. It is therefore desirable to assure that the more important packets are more likely to arrive uncorrupted and that less important packets, even if they are corrupted, are not retransmitted. The retransmission characteristics of a network can be managed in a variety of ways including selection of TCP/IP and UDP style transmissions along with other network handshake operations.

The different subbands for each component are passed via path 802 to the encoding step. The encoding step is performed for each subband with the encoding with FEC performed on the first subband 836, on the second subband 834, on the third subband 832 and on the fourth subband 830. Depending on the type of encoding performed, there are various other steps applied to the data prior to or as part of the encoding process. These steps can include filtering or differencing between the subbands. Encoding the differences between the subbands is one of the steps of a type of compression. For typical images, most of the image energy resides in the lower resolution representations of the image. The other bands contain higher frequency detail that is used to enhance the quality of the image. The encoding steps for each of the subbands uses a method and bitrate most suitable for the amount of visual detail contained in that subimage.

There are also other scalable coding techniques that can used to transmit the different image subbands across different communication channels having different transmission characteristics. This technique can be used to match the higher priority source subbands with the higher quality transmission channels. This source based coding can be used where the base video layer is transmitted in a heavily protected manner and the upper layers are protected less or not at all. This can lead to good overall performance for error concealment and will allow for graceful degradation of the image quality. Another technique of Error Resilient Entropy Coding (EREC) can also be used for high resilience to transmission errors.

In addition to the dependence on the subimage visual detail, the type of encoding and the strength of the FEC is dependent on the transmission channel error characteristics. The transmission channel feedback 840 is fed to the communications processor 844 which then feeds back the information via path 842 to each of the subband encoding blocks. Each of the subband encoders transmits the encoded subimage information to the communications processor 844. The communications processor 844 then transmits the compressed streams via path 850 to the target transmission subsystem.

As an extension to the described 2-D subband coding, 3-D subband coding can also be used. For 3-D subband coding, the subsampled component video signals are decomposed into video components ranging from low spatial and temporal resolution components to components with higher frequency details. These components are encoded independently using the method appropriate for preserving the image energy contained in the component. The compression is also performed independently through quantizing the various components and entropy coding of the quantized values. The decoding step is able to reconstruct the appropriate video image by recovering and combining the various image components. A properly designed system, through the encoding and decoding of the video, preserves the psycho-visual properties of the video image. Block matching and block motion schemes can be used for motion tracking where the block sizes may be smaller than the precinct size. Other advanced methods such as applying more sophisticated motion coding techniques, image synthesis, or object-based coding are also possible.

Additional optimizations with respect to the transmission protocol are also possible. For example, in one type of system there can be packets that are retransmitted if errors occur and there can be packets that are not retransmitted regardless of errors. There are also various error rate thresholds that can be set to determine if packets need to be resent. By managing the FEC allocation, along with the packet transmission protocol with respect to the different subbands of the frame, the transmission process can be optimized to assure that the decoded video has the highest possible quality. Some types of transmission protocols have additional channel coding that may be managed independently or combined with the encoding steps.

System level optimizations that specifically combine the subband encoding with the UWB protocol are also possible. In one embodiment, the subband with the most image energy utilizes the higher priority hard reservation scheme of the medium access control (MAC) protocol. Additionally, the low order band groups of the UWB spectrum that typically have higher ranges can be used for the higher image energy subbands. In this case, even if a portable TV was out of range of the UWB high order band groups, the receiver would still receive the UWB low order band groups and be able to display a moderate or low resolution representation of the original video.

FIG. 8B shows a tightly coupled two chip implementation of a Graphics and Display Controller 212 utilizing an external Display Encoder Integrated Circuit (IC) 803. The Display Encoder IC 803 is coupled to the SDVO2 216 to receive uncompressed pixels into a pixel input port. The Display Encoder IC 803 then processes the pixels into an encoded form and outputs the encoded pixels on bus 804. Graphics and Display Controller 212 receives the encoded pixels over bus 804 to an input port. The bus may be a high speed serial bus, a parallel bus or a bus designed for another purpose that has adequate bandwidth to receive the encoded data. One example of such a bus is the CCIR656 bus which, when operated at an increased frequency, can be used for transferring the encoded data from the Display Encoder IC 803 to the Graphics and Display controller 212.

As described earlier with respect to the Multi-Display Processor 224 and the Display Encoder 752, the Display Encoder IC 803 may utilize a variety of internal buffering and external memory (not shown) schemes to perform a variety of encoding methods. The Graphics and Display Controller 212 may provide the non-encoded pixels over the SDVO2 216 output in a variety of configurations including scan line or block based. The control signal and format information may be communicated between the two chips 212 and 803 in a variety of ways including having the information embedded in the SDVO2 216 output stream, using a control protocol on either the SDVO2 line 216 or bus 804, or using a separate communication channel (not shown).

The Display Encoder IC 803 may have the full capabilities of the Multi-Display Processor 224 or of a subset of features of the Frame Comparer 602, Frame Manager 604, Data Encoder 606, and System Controller 608. Functions that are not included in the Display Encoder IC 803 may be managed by a combination of the main system CPU 202 and the Graphic and Display Controller 212. For example, the SDVO2 output may be managed to only transmit frames or tiles that have already been determined to be different from the prior frame or tile. As such, the Display Encoder IC 803 would not need to perform the functions of the Frame Comparer 602 or the Frame Manager 604. The Graphics and Display Controller 212, knowing which frames or tiles were transmitted to the Display Encoder IC 803, would know which encoded frames or tiles were being received.

The system 800 embodiment may be particularly well suited for a computer to support a second remote or wireless display system. In such an embodiment, the SDVO1 214 is connected to the internal display and the SDVO2 on line 216 output is used to support an external display. In one configuration, the external display output SDVO2 216 is encoded by the Display Encoder IC 803, provided over bus 804 back to the Graphics and Display controller 212, transferred over the system bus 206 and output over a network interface to a remote or wireless display system such as a large desktop LCD monitor that includes the necessary wireless and decoder subsystems such as described in system 300.

Figure 9A:
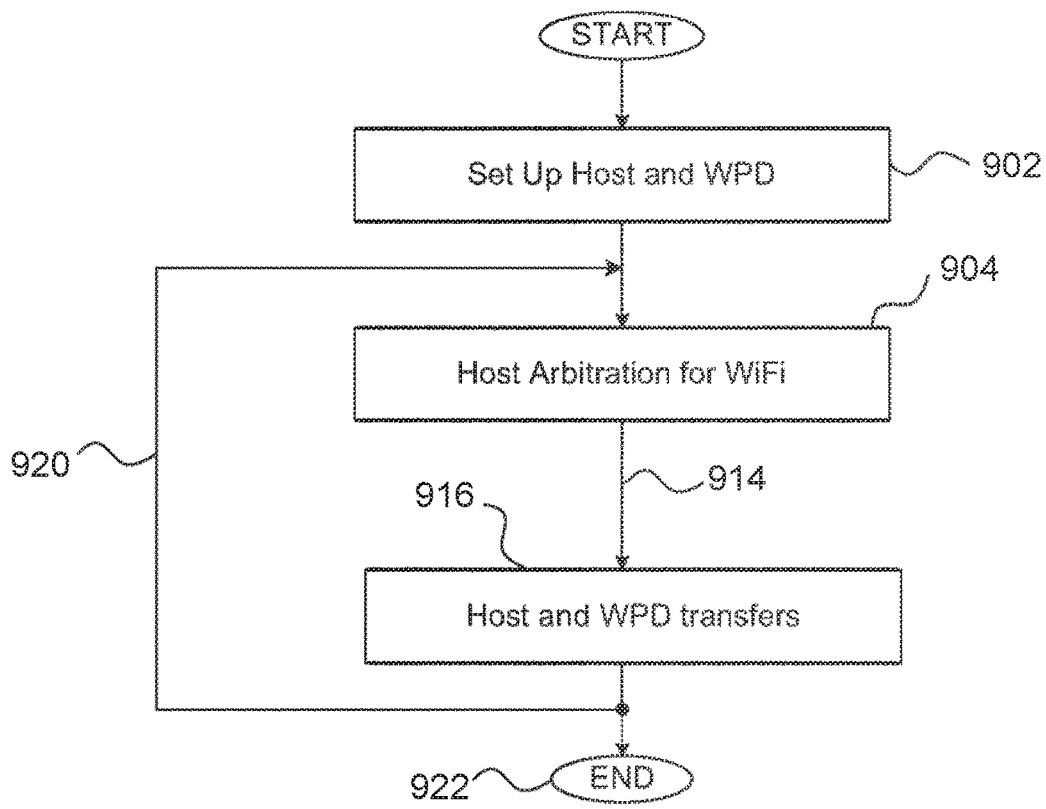
FIG. 9A is a flowchart of steps in a method for performing set up, arbitration and transfers with one embodiment of the invention.

FIG. 9A is a flowchart of method steps for performing one type of communication between the host system and a Wireless Peripheral Device (WPD). At the start, the host system is already part of the WiFi network and is in standard infrastructure mode. In this method, in step 902, the Host System and the WPD are set up and configured such that communication between the two will be possible in the network environment. The setup procedure may be automatic when the WPD powers on or may require putting the WPD into a special setup mode. The setup mode may be similar to the setup procedure performed by Bluetooth devices where one typically presses a "connect device" button on the peripheral and runs a setup program on the host.

Unlike Bluetooth, which utilizes a different RF subsystem than the network infrastructure, the host system communicates with the WiFi peripheral device utilizing the same RF subsystem and RF spectrum as used for communicating with the network infrastructure. As such, in step 904, when the host initiates the setup procedure, it must first successfully arbitrate for the WiFi channel. Once the host has control of the WiFi channel, in step 916 the host can perform whatever reads and writes are required to perform the setup with the WPD and determine the profile and capabilities of the WPD. The setup procedure may also include added security steps of entering a code or another security step to assure that the WPD is the intended device. Part of the setup may result in the host system either learning the MAC address of the WPD or of the host system requesting an additional IP address from the network infrastructure, such as from the DHCP server, and relaying the assigned IP address to the WPD. In another setup procedure, once validated, the WPD is provided with the secure network key so that the WPD may access the secure network directly. Once the transfers between the host system and the WPD have been completed, or once the RF channel needs to be relinquished, the flowchart follows path 920.

Figure 9B:
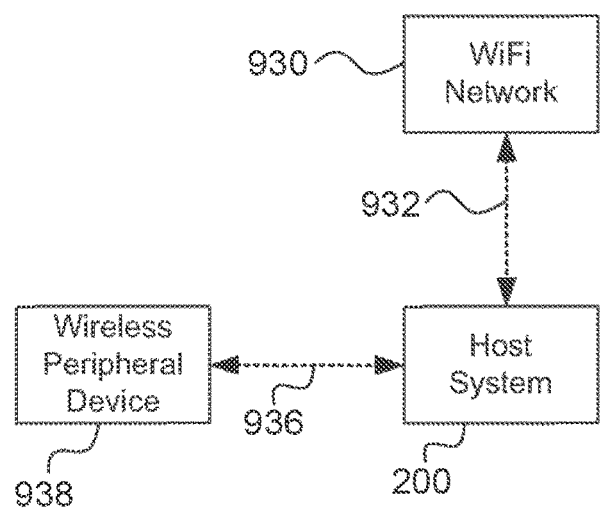
FIG. 9B represents the elements and communication channels corresponding to FIG. 9A with one embodiment of the invention.

FIG. 9B illustrates the communication path 932 between the WiFi network 930 and the Host System 200. Also shown is the communication path 936 between the WPD 938 and the Host System 200. As illustrated by this example, the communication between the WPD 938 and the WIN Network 930 takes place with the Host System 200 acting as the intermediary. Referring back to the flow chart of FIG. 9A, step 904 host arbitration for WiFi may be indirectly initiated by the WPD 938 through either a predetermined time interval or from another means. The WPD 938 operation of FIGS. 9A and 9B is for a WPD that does not include the capability to directly interface to the WiFi network. Another type of WPD may also include a full or partial WiFi capability where the WPD may more directly participate in the WiFi network arbitration. Another type of WPD may fully function on the WIN network when it is out of range of the Host System, but has another wired or wireless means to connect to the WiFi network.

Figure 9C:
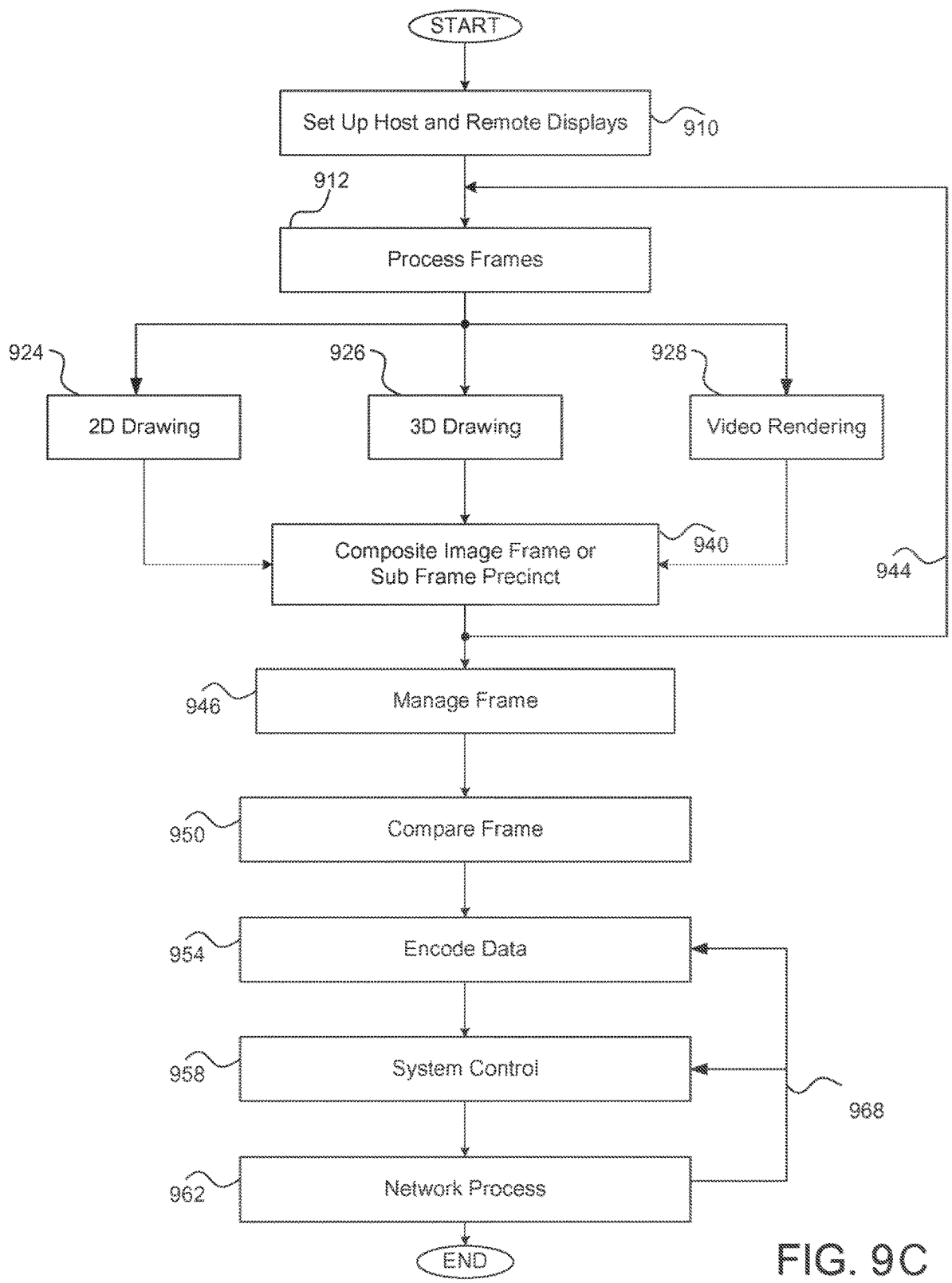
FIG. 9C is a flowchart of steps in a method for performing multi-display windowing, selective encoding and selective transmission, in accordance with one embodiment of the invention.

FIG. 9C is a flowchart of method steps for performing the multi-display processing procedure in accordance with one embodiment of the invention. For the sake of clarity, the procedure is discussed in reference to display data. However, procedures relating to audio and other data are equally contemplated for use in conjunction with the invention. In the FIG. 9C embodiment, initially, in step 910, multi-room television system 200 and remote display system 300 follow the various procedures to initialize and set up the host side and display side for the various subsystems to enable each display. In step 912, the graphics operations of graphics display controller 212 process the various types of inputs to determine what graphics operations need to be performed. This simplified flow chart does not specifically call for the input from the remote display system 300 to be processed for determining the responsive graphics operations, though another method would include those steps.

If graphics operations include 2D drawing, then, in step 924, the 2D drawing engine 720 or associated function unit of graphics and display processor 212 preferably processes the operations into the appropriate display surface in the appropriate RAM. Similarly, in step 926 3D drawing is performed to the appropriate display surface in RAM by either the 3D GPU 722 or the associated unit in graphics and display processor 212. Similarly, in step 928, video rendering is performed to the appropriate display surface in RAM by one of the video processing units 724, 726 or the associated units in graphics and display processor 212. Though not shown, any CPU subsystem 202-initiated drawing operations to the RAM would occur at this stage of the flow as well.

The system in step 940 composites the multiple surfaces into a single image frame which is suitable for display. This compositing can be performed with any combination of operations by the CPU subsystem 202, 2D engine 720, 3D GPU 722, video processing elements 724, 726 or 764, multi-display frame manager with display controller 750 or the comparable function blocks of graphics and display controller 212. Once the compositing operation is performed, step 946 performs the frame management with the frame manager 604 or multi-display frame manager with display controller 750 which includes tracking the frame updates for each remote display. Then step 950 compares the frame to the previous frame for that same remote display system via a combination of the software tracking layer, combined with frame comparer 602 or the multi-display frame manager with display controller 750. The compare frame step 950 identifies which areas of each frame need to be updated for the remote displays where the areas can be identified by precincts, scan line groups or another manner.

The system, in step 954, then encodes the data that requires the update via a combination of software and data encoder 606 or display data encoder 752. The data encoding step 954 can use the tracking software to identify what type of data is going to be encoded so that the most efficient method of encoding is selected or the encoding hardware can adaptively perform the encoding without any knowledge of the data. Feedback path 968 from the network process step 962 may be used by the encode data step 954 in order to more efficiently encode the data to dynamically match the encoding to the characteristics of the network channel. This may include adjustments to the compression ratio as well as to the error resilience of the encoded data. The error resilience may identify different priorities of data within the encoded data stream for any given display which is used by in step 958 to perform the system control for each frame update.

The system, in step 958, utilizes the encoded data information and the associated system information to manage the frame updates to the remote displays. The system control step 958 also utilizes the network transmission channel information via feedback path 968 to manage and select some of the higher level network decisions. This system control step is performed with some combination of the CPU subsystem 202 and system controller unit 608 or multi-display frame manager with display controller 750.

The network process step 962 uses the information from the system control. This information can include information as to which remote display requires which frame update streams, what type of network transmission protocol is used for each frame update stream, and what the priority and retry characteristics are for each portion of each frame update stream. The network process step 962 utilizes the network controller 228 to manage any number of network connections. The various networks may include Gigabit Ethernet, 10/100 Ethernet, Power Line Ethernet, Coaxial cable based Ethernet, phone line based Ethernet, or wireless Ethernet standards such as 802.11a, b, g, n, s and future derivatives. Other non-Ethernet connections are also possible and can include USB, 1394a, 1394b, 1394c or other wireless protocols such as Ultra Wide Band (UWB) or WiMAX.

Figure 10:
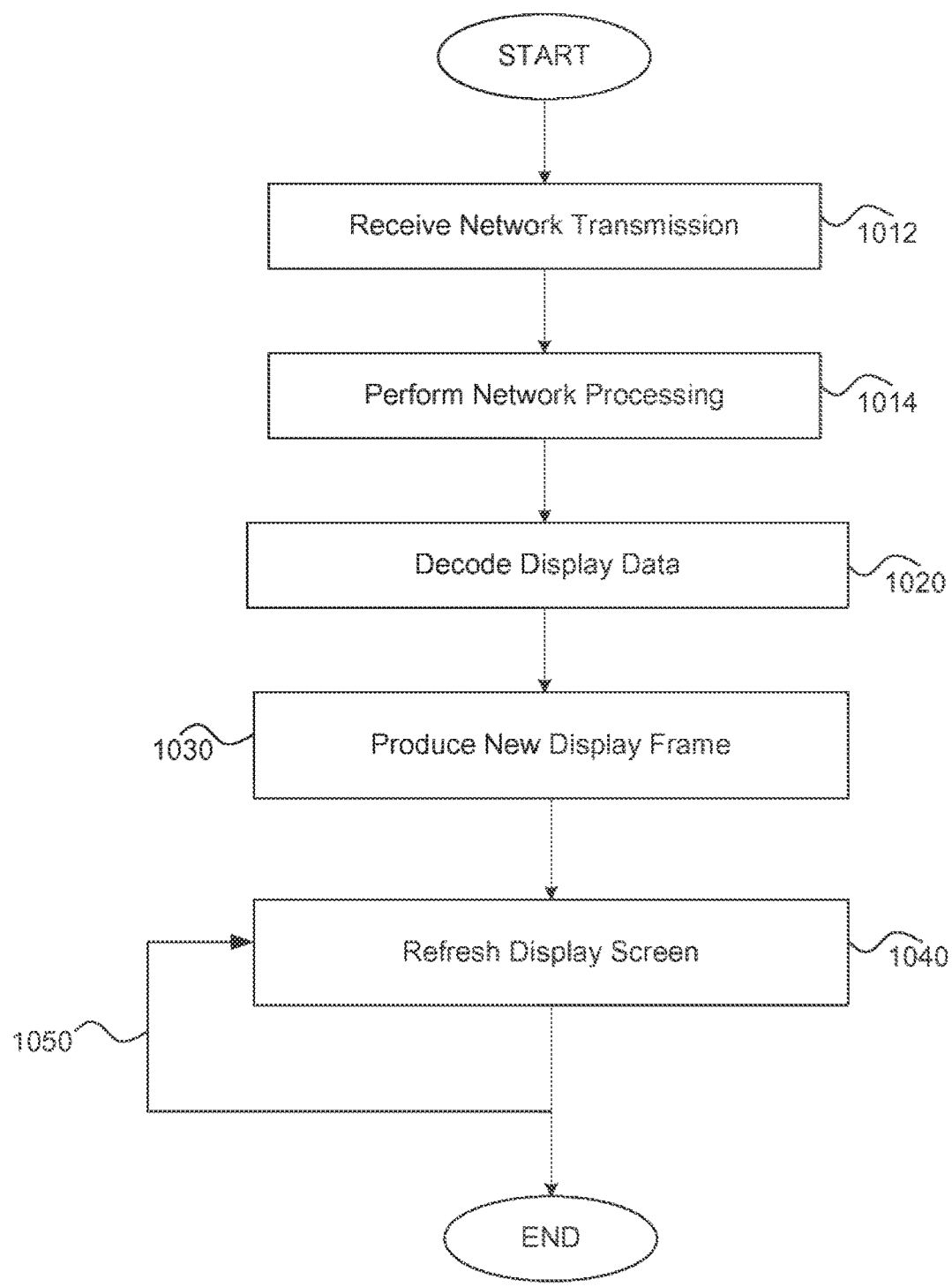
FIG. 10 is a flowchart of steps in a method for performing a local decode and display procedure for a client, in accordance with one embodiment of the invention.

FIG. 10 is a flowchart of steps in a method for performing a network reception and display procedure in accordance with one embodiment of the invention. For reasons of clarity, the procedure is discussed in reference to display data. However, procedures relating to audio and other data are equally contemplated for use in conjunction with the present invention.

In the FIG. 10 embodiment, initially, in step 1012, remote display system 300 preferably receives a frame update stream from host computer 200 of a multi-display system 100. Then, in step 1014, network controller 326 preferably performs a network processing procedure to execute the network protocols to receive the transmitted data whether the transmission was wired or wireless.

In step 1020, data decoder and frame manager 328 receives and preferably manipulates the data information into an appropriate displayable format. In step 1030, data decoder and frame manager 328 preferably may access the data manipulated in step 1020 and produce an updated display frame into RAM 312. The updated display frame may include display frame data from prior frames, the manipulated and decoded new frame data, and any processing required to conceal display data errors that occurred during transmission of the new frame data.

Finally, in step 1040, display controller 330 provides the most recently completed display frame data to remote display screen 310 for viewing by a user of the remote display system 300. In the absence of either a screen saving or power down mode, the display processor will continue to update the remote display screen 310 with the most recently completed display frame, as indicated with feedback path 1050, in the process of display refresh.

The invention has been explained above with reference to a preferred embodiment. Other embodiments will be apparent to those skilled in the art in light of this disclosure. For example, the present invention may readily be implemented using configurations other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A wireless mesh-enabled host device, comprising:
digital processor apparatus;
a Wi-Fi-based wireless interface in data communication with the digital processor apparatus and configured to enable:
   (i) establishment of a first radio frequency (RF) link to wirelessly connect the wireless mesh-enabled host device to a wireless infrastructure access point having data connectivity to an external data network; and
   (ii) establishment of a second radio frequency (RF) link to wirelessly connect the wireless mesh-enabled host device to at least one wireless device, wherein one or more channels of the first RF link at least partially overlap with one or more channels of the second RF link;
computerized logic in data communication with the digital processor apparatus and configured to, when executed, enable the wireless mesh-enabled host device to communicate data both via the first RF link and the second RF link, the communication of data via the second RF link utilizing a mode of operation by the mesh-enabled host device which allows at least data communication between the wireless mesh-enabled host device and the at least one wireless device via the second RF link according to one or more timeslots reserved by the wireless mesh-enabled host device; and
arbitration logic configured to avoid interference in the at least partially overlapping channels so that the one or more channels of the second RF link that at least partially overlap the one or more channels of the first RF link are clear for the wireless mesh-enabled host device to communicate with the at least one wireless device;
wherein the wireless mesh-enabled host device acts as an intermediary device between the at least one wireless device and the wireless infrastructure access point, the at least one wireless device not capable of otherwise directly interfacing with the wireless infrastructure access point.

2. The wireless mesh-enabled host device of claim 1, wherein the reservation of the one or more timeslots by the wireless mesh-enabled host device.

3. The wireless mesh-enabled host device of claim 1, wherein the data communication between the wireless mesh-enabled host device and the at least one wireless device via the second RF link is controlled by the wireless mesh-enabled host device, the control comprising at least the reservation of the one or more time slots.

4. The wireless mesh-enabled host device of claim 1, wherein the data communication via the second RF link is conducted pursuant to the wireless mesh-enabled host device polling the at least one wireless device.

5. The wireless mesh-enabled host device of claim 1, wherein the polling comprises the wireless mesh-enabled host device initiating a data communication request to the at least one wireless device.

6. The wireless mesh-enabled host device of claim 1, wherein the polling comprises the wireless mesh-enabled host device determining whether the at least one wireless device has a pending request for the wireless mesh-enabled host device.

7. The wireless mesh-enabled host device of claim 1, wherein the data communication via the second RF link is conducted pursuant to the at least one wireless device monitoring at least one aspect of the reservation by the wireless mesh-enabled host device.

8. The wireless mesh-enabled host device of claim 7, wherein the monitoring of the at least one aspect by the at least one wireless device is based at least in part on the at least one wireless device determining that it has a pending communication to be transacted with the wireless mesh-enabled host device.

9. The wireless mesh-enabled host device of claim 1, wherein the data communication via the second RF link is conducted pursuant to a Layer-2 data communication process between the wireless mesh-enabled host device and the at least one wireless device, the Layer-2 process comprising utilization of respective MAC addresses for the wireless mesh-enabled host device and the at least one wireless device.

10. The wireless mesh-enabled host device of claim 1, wherein:
the wireless mesh-enabled host device is configured to use a first protocol for the data communications via the first RF link, the first protocol dictated at least in part by one or more capabilities of the wireless infrastructure access point, and a second protocol different than the first protocol for the data communications via second RF link; and
wherein the wireless mesh-enabled host device is configured to provide the one or more capabilities of the wireless infrastructure access point to the at least one wireless device.

11. The wireless mesh-enabled host device of claim 10, wherein the second protocol comprises a protocol reduced in complexity relative to the first protocol, the second protocol utilizing a Layer-2 process for identification of at least one of the wireless mesh-enabled host device or the wireless device, the first protocol using a process above Layer-2 for identification of at least the wireless mesh-enabled host device.

12. The wireless mesh-enabled host device of claim 1, wherein the reservation of the one or more timeslots by the wireless mesh-enabled host device is responsive to data communication from the wireless device, the data communication configured to initiate the reservation.

13. The wireless mesh-enabled host device of claim 1, wherein the computerized logic is further configured to, when executed, cause the wireless mesh-enabled host device to transact data with the wireless device in order to determine at least one of profile data or capability data of the wireless device.

14. A method of operating a wireless mesh-enabled host device, the method comprising:
causing creation of a plurality of contention-free periods (CFPs) for a common radio frequency (RF) medium, whereby the wireless mesh-enabled host device can perform each of: (i) data communication with an infrastructure wireless access point in data communication with an external data network via a first wireless link making use of the common RF medium, and (ii) data communication with a wireless device via a second wireless link making use of the common RF medium, using respective portions of the plurality of CFPs; and utilizing the respective portions of the plurality of CFPs of the common RF medium to perform (i) the data communication with the infrastructure wireless access point via the first wireless link, and (ii) the data communication with the wireless device via the second wireless link;

wherein the (i) the data communication with the infrastructure wireless access point via the first wireless link comprises a mesh data communication configured to provide at least the wireless mesh-enabled host device with access to the external data network, and (ii) the data communication with the wireless device via the second wireless link comprises utilization of a MAC-based protocol configured to provide reduced complexity data interchange between the wireless mesh-enabled host device and the wireless device relative to a protocol used for the data communication with the infrastructure wireless access point via the first wireless link; and wherein identifiers for both the wireless mesh-enabled host device and the wireless device are associated with a layer of a protocol stack below a network layer and comprise MAC identifiers associated with Layer 2 of the protocol stack;

wherein the utilizing of the respective portions of the plurality of CFPs of the common RF medium to perform (i) the data communication with the infrastructure wireless access point via the first wireless link, and (ii) the data communication with the wireless device via the second wireless link, requires that the wireless mesh-enabled host device arbitrate for control of the first wireless link prior to the provision of the reduced complexity data interchange between the wireless mesh-enabled host device and the wireless device.

15. The method of claim 14, wherein the creation of a plurality of contention-free periods (CFPs) comprises the wireless mesh-enabled host device implementing a protocol whereby the wireless mesh-enabled host device gains control of the RF medium, the gaining control of the RF medium comprising reserving one or more timeslots corresponding to the plurality of CFPs.

16. The method of claim 14, wherein the creation of a plurality of contention-free periods (CFPs) comprises employing an adaptive size for at least one contention window associated with the plurality of CFPs.

17. The method of claim 14, wherein at least one of the (i) data communication with an infrastructure wireless access point in data communication with an external data network via a first wireless link making use of the common RF medium, or (ii) data communication with a wireless device via a second wireless link making use of the common RF medium, using respective portions of the plurality of CFPs, comprises using at least different frame sizes, for the at least one data communication.

18. A wireless mesh-enabled host device comprising at least one wireless interface and computerized logic configured to, when executed, cause the wireless mesh-enabled host device to at least:

perform data communication with a wireless-enabled device in data communication with an external data network via a first wireless link established over the at least one wireless interface and use of a wireless medium; and perform data communication with a second wireless-enabled device via a second wireless link established over the at least one wireless interface and use of the wireless medium without a need to virtualize the at least one wireless interface; and wherein:
the data communication with the first wireless-enabled device via the first wireless link comprises a mesh data communication configured to provide at least the wireless mesh-enabled host device with access to the external data network, the mesh data communication performed according to a first protocol and during a first of a plurality of time slots within the wireless medium, the plurality of time slots reserved by the wireless mesh-enabled host device;

the data communication with the second wireless-enabled device via the second wireless link comprises a second mesh data communication configured to provide at least the second wireless-enabled device with access to the external data network via at least the first wireless-enabled device and the wireless mesh-enabled host device, the second mesh data communication performed according to a second protocol and during a second of the plurality of time slots;

the wireless-enabled device comprises a wireless peripheral;

the wireless mesh-enabled host device communicates with the wireless peripheral in WiFi-P mode; and the WiFi-P mode is configured to cause the wireless-enabled device to enter a low-power mode when within wireless range of the wireless mesh-enabled host device.

19. The wireless mesh-enabled host device of claim 18, wherein at least one of the first protocol or the second protocol comprises a MAC-based protocol configured to utilize at least a MAC address of the wireless mesh-enabled device.

20. A wireless mesh-enabled host device, comprising:
digital processor apparatus;
a Wi-Fi-based wireless interface in data communication with the digital processor apparatus and configured to enable:
(i) establishment of a first radio frequency (RF) link to wirelessly connect the wireless mesh-enabled host device to a wireless infrastructure access point having data connectivity to an external data network, wherein the wireless infrastructure access point comprises an 802.11-compliant access point that is unaware when the wireless mesh-enabled host device communicates concurrently with another device using the first RF link;
(ii) establishment of a second radio frequency (RF) link to wirelessly connect the wireless mesh-enabled host device to at least one wireless device with bandwidth below a prescribed threshold, wherein one or more channels of the first RF link at least partially overlap with one or more channels of the second RF link; and
(iii) establishment of a third radio frequency (RF) link to wirelessly connect the wireless mesh-enabled host device to at least one wireless device with bandwidth above the prescribed threshold;
computerized logic in data communication with the digital processor apparatus and configured to, when executed, enable the wireless mesh-enabled host device to communicate data both via the first RF link and the second RF link, the communication of data via the second RF link utilizing a mode of operation by the mesh-enabled host device which allows at least data communication between the wireless mesh-enabled host device and the at least one wireless device via the second RF link according to one or more timeslots reserved by the wireless mesh-enabled host device.

21. The wireless mesh-enabled host device of claim 20, wherein:
the another device comprises a wireless peripheral, and wherein the wireless mesh-enabled host device communicates with the wireless peripheral in WiFi-P mode; and
the WiFi-P mode is configured to cause the another device to enter a low-power mode when within wireless range of the wireless mesh-enabled host device.

22. The wireless mesh-enabled host device of claim 20, wherein one or more channels of the first RF link at least partially overlap with one or more channels of the second RF link, and further comprising arbitration logic configured to avoid interference in the at least partially overlapping channels so that the one or more channels of the second RF link that at least partially overlap the one or more channels of the first RF link are clear for the wireless mesh-enabled host device to communicate with the at least one wireless device.

23. The wireless mesh-enabled host device of claim 20, wherein identifiers for both the wireless mesh-enabled host device and the at least one wireless device are associated with a layer of a protocol stack below a network layer and comprise MAC (media access control) identifiers associated with Layer 2 of the protocol stack.

24. The wireless mesh-enabled host device of claim 20, wherein the computerized logic is further configured to enable the wireless mesh-enabled host device to communicate data both via the first RF link and the second RF link without a need to virtualize the Wi-Fi-based wireless interface.

25. The wireless mesh-enabled host device of claim 1, wherein the wireless mesh-enabled host device is configured to (i) validate the at least one wireless device, (ii) request a Wi-Fi network key on behalf of the at least one wireless device, and (iii) initially provide the Wi-Fi network key to the at least one wireless device via use of WiFi-P (Wi-Fi Peripheral) mode in conjunction with a secure network procedure which enables out-of-band communication of the Wi-Fi network key.

\* \* \* \* \*